United States Patent [19]

Kimata

[11] Patent Number: 5,043,561

[45] Date of Patent: Aug. 27, 1991

[54] FARE COLLECTION SYSTEM USING A BOARDING TICKET AND ADDITIONAL MONEY CARD

[75] Inventor: Sigeki Kimata, Yokohama, Japan

[73] Assignee: Kabushiki Kaisha Toshiba, Kawasaki, Japan

[21] Appl. No.: 397,902

[22] Filed: Aug. 24, 1989

[30] Foreign Application Priority Data

| | | | |
|---|---|---|---|
| Sep. 28, 1988 | [JP] | Japan | 63-242925 |
| Sep. 28, 1988 | [JP] | Japan | 63-242926 |
| Sep. 28, 1988 | [JP] | Japan | 63-242928 |
| Sep. 28, 1988 | [JP] | Japan | 63-242933 |

[51] Int. Cl.[5] .......... G07B 15/02; G06F 15/20

[52] U.S. Cl. .......... 235/384; 235/375

[58] Field of Search .......... 235/379, 380, 381, 384, 235/385, 375

[56] References Cited

U.S. PATENT DOCUMENTS

| | | | |
|---|---|---|---|
| 3,501,622 | 3/1970 | Weir et al. | 235/384 |
| 3,949,363 | 4/1976 | Holm | 235/437 |
| 4,439,636 | 3/1984 | Newkirk et al. | 379/123 |
| 4,518,852 | 5/1985 | Stockburger et al. | 235/383 |
| 4,709,136 | 11/1987 | Watanabe | 235/380 |
| 4,731,575 | 3/1988 | Sloan | 235/381 |
| 4,751,186 | 7/1988 | Heberle et al. | 235/380 |
| 4,837,426 | 6/1989 | Peare et al. | 235/380 |
| 4,907,257 | 3/1990 | Asano et al. | 235/380 |

FOREIGN PATENT DOCUMENTS

| | | | |
|---|---|---|---|
| 57-189269 | 11/1982 | Japan | 235/381 |

OTHER PUBLICATIONS

"Metrorail", Jun. 30, 1984.

*Primary Examiner*—Stuart S. Levy
*Assistant Examiner*—Edward Sikorski
*Attorney, Agent, or Firm*—Finnegan, Henderson, Farabow, Garrett and Dunner

[57] ABSTRACT

An automatic apparatus and method for face examination and fare adjustment processing in which a monetary value of a money card or other fare card inserted from an insertion port for adjustment purposes according to the instruction on the display unit is read by a read head, a new monetary value is calculated by a CPU by subtracting a monetary value corresponding to an amount to be adjusted from the read monetary value, magnetic information corresponding to the calculated new monetary value is updated and recorded on the money card by a write head, the money card on a convey path is ejected from an ejection port by a conveyor belt after the magnetic information is recorded, and a gate is opened to allow passage of a person who inserted the money card. Since a passenger does not insert small change or the like, fare adjustment processing can be performed at the same entrance and exit gates at which such cards are normally used within a short period of time, and efficient examination processing is realized. In operation, a first (boarding) ticket is presented at the exit gate. If additional money is required, the passenger must also insert a second (money) card from which the additional fare is deducted. If the gate detects a write error on a pass, the passenger must reinsert that pass to correct the error.

9 Claims, 19 Drawing Sheets

FARE COLLECTION SYSTEM USING A BOARDING TICKET AND ADDITIONAL MONEY CARD

BACKGROUND OF THE INVENTION

1. Field of the Invention

The present invention relates to an automatic examination apparatus and, more particularly, to an automatic examination apparatus which receives a ticket, pass, coupon ticket, or the like to permit a passenger to enter or exit a gate in a traffic system such as a railway.

2. Description of the Related Art

In a traffic system such as a railway, an automatic examination apparatus is used. The automatic examination apparatus receives a ticket, pass, coupon ticket, or the like to permit a passenger on-boarding, i.e., to enter a gate or off-boarding, i.e., to exit a gate.

In the traffic system, a so-called prepaid card, i.e., a prepaid money card, is used in place of small change. The money card is inserted in an automatic ticket machine to purchase a so-called day ticket. The day ticket is then inserted in the automatic examination apparatus, so that passage through the automatic examination apparatus, i.e., entrance in a gate is permitted.

In this apparatus, when a passenger gets off beyond his or her destination and must adjust a fare, he must pay a difference on his ticket at a separate automatic fare adjustment machine or a fare adjustment office with a clerk. In this case, a passenger must go to two places for fare adjustment, resulting in severe inconvenience. When two kinds of apparatuses are used, cost is increased.

Thus, an automatic examination apparatus which has a fare adjustment function by insertion of cash has been developed.

Even though this apparatus can eliminate a drawback that a passenger must go to another place for fare adjustment, fare adjustment processing takes much time and efficient examination processing is disturbed.

When a prepaid card is used, a passenger must purchase a ticket at an automatic ticket machine even in rush hour or when busy, resulting in inconvenience. In particular, a passenger using a money card must purchase the money card, and then purchase a day ticket using the money card. As a result, the merit of the money card, i.e., an alternative to small change, is reduced.

For this purpose, there is proposed a system in which a passenger can directly enter or exit a gate through an automatic examination apparatus corresponding to a boarding section using the money card without purchasing a ticket at an automatic ticket machine (U.S. Pat. No. 3,501,622).

In this system, however, when the money card is directly used in the automatic examination apparatus, if the balance of the money card is smaller than a fare of a boarding section, the difference must be paid at a separate fare adjustment machine or to a clerk at a fare adjustment office. Thus, a passenger must go to two places for fare adjustment, resulting in severe inconvenience. When two kinds of apparatuses are used, cost is increased.

When the money card is directly used in the automatic examination apparatus, magnetic information is recorded on the money card, and visual information is also printed thereon.

When an error occurs during such processing, the money card is inserted again to retry examination.

In this system, magnetic information is recorded and visual information is printed regardless of an error in magnetic recording or printing. For this reason, when magnetic information is normally recorded and a printing error occurs, if examination is retired, the content of the magnetic information is repetitively rewritten, and accurate retrial for an error cannot be performed.

The prepaid system of the money card may be losing its public acceptance. Thus, a demand has arisen for an operation system which can improve its public acceptance.

As an operation system for improving the popularity of the money card, a system in which a fare is discounted according to time-of-day is proposed.

Some passengers may use a railway in a time-of-day other than rush hour. Thus, a fare in a time-of-day other than rush hour is discounted, and passengers who can use a railway in a time zone other than rush hour are shifted to reduce rush hour congestion.

Therefore, a system which can improve public acceptance of the money card and can reduce rush hour congestion, is needed.

SUMMARY OF THE INVENTION

It is an object of the present invention to provide an automatic examination apparatus which can shorten fare adjustment processing and can perform efficient examination processing.

It is another object of the present invention to provide an automatic examination apparatus wherein when a monetary value of a recording medium is smaller than a monetary value corresponding to a fare and a shortage of fare occurs, a monetary value corresponding to the shortage of fare can be compensated using a successively inserted recording medium.

It is still another object of the present invention to provide an automatic examination apparatus wherein when an error occurs during processing for a recording medium having a monetary value, the recording medium is inserted again from an insertion port, so that retrial suitable for the error can be performed.

It is still another object of the present invention to provide an automatic examination apparatus which can improve public acceptance and can reduce rush hour congestion.

According to the present invention, there is provided an automatic examination apparatus, and a corresponding method, for permitting exit from a gate, comprising:

means including a convey path for conveying a first recording medium which is inserted from an insertion port and on which first information is recorded, reading means for reading the first information on said first recording medium during conveyance along said convey path, and judging means for judging in accordance with the read result of said reading means whether or not said first recording medium is correct, and for judging whether or not fare adjustment processing is necessary;

instruction means for, when said judging means determines that the fare adjustment processing is necessary, instructing insertion of a second recording medium which is different from said first recording medium and on which second information is recorded; and processing means for causing said reading means to read the second information on said second recording medium inserted from said insertion port upon instruction of said instruction means and performing fare adjustment processing on the basis of the read second information.

According to the present invention, there is provided an automatic examination apparatus for permitting entrance into a gate or exit from a gate, comprising:

means including a convey path for conveying a recording medium which is inserted from an insertion port and on which magnetic information is recorded, reading means for reading the magnetic information on said recording medium during conveyance along said convey path, first judging means for judging in accordance with the read result of said reading means whether or not said recording medium is correct, recording means for recording magnetic information on said recording medium conveyed on said convey path, printing means for printing visual information on said recording medium after the magnetic information is recorded by said recording means, and ejecting means for ejecting said recording medium on said convey path from an ejection port after the magnetic information are recorded and the visual information are printed on said recording medium;

detection means for detecting an error of the magnetic information recorded on said recording medium or an error of the visual information printed on said recording medium;

storage means for, when said detection means detects the error, storing an error condition;

first processing means for, when said detection means detects the error, causing said ejecting means to eject said recording medium on said convey path from said ejection port;

second judging means for, when said recording medium is ejected by said first processing means, judging whether or not a recording medium inserted from said insertion port is the same as the recording medium ejected by said ejecting means; and second processing means for, when said second judging means determines that the identical recording medium is inserted, causing said recording means to record magnetic information again or causing said printing means to print visual information again in accordance with the error condition stored in said storage means.

According to the present invention, there is provided an apparatus wherein when the error of the magnetic information recorded on said recording medium is detected, said storage means stores data indicating that neither recording of the magnetic information nor printing of the visual information are performed, and when only the error of the visual information printed on said recording medium is detected, stores data indicating that only printing of the visual information is not performed.

According to the present invention, there is provided an automatic examination apparatus which has reading means for reading information on a recording medium and allows exit from a gate, comprising:

transaction means for performing a transaction on the basis of the information read by said reading means;

judging means for judging whether the transaction by said transaction means is performed using a first or second fare; and instruction means for instructing said transaction means to perform the transaction using the fare judged by said judging means.

DETAILED DESCRIPTION OF THE PREFERRED EMBODIMENTS

Figure 3:
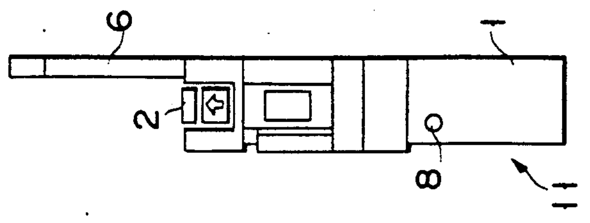
FIGS. 1, 2, and 3 are views showing an outer appearance of an automatic examination apparatus of the present invention.
Figure 1:
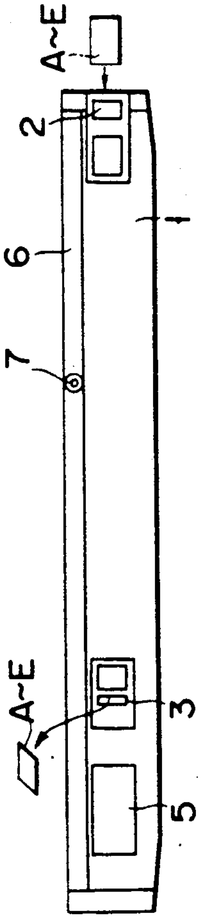
Figure 2:
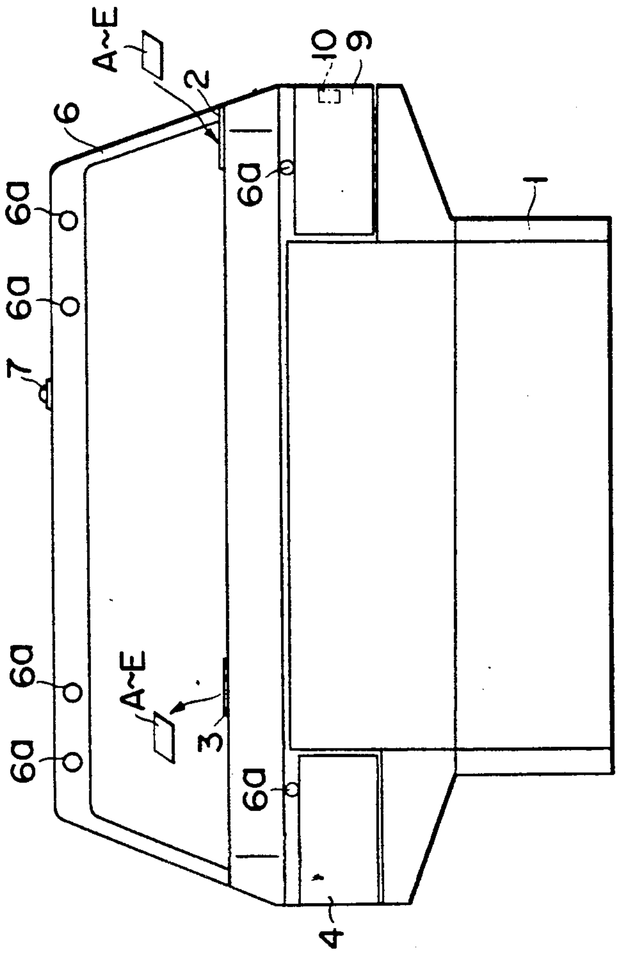

FIGS. 1 to 3 show an outer appearance of an automatic examination apparatus of the present invention.

Each main body 1 of a plurality of automatic examination apparatuses illustrated in FIGS. 1 to 3 comprises an insertion port 2, an ejection port 3, a gate 4, a display unit 5, a passenger detector 6, a child indicator 7, a physically handicapped person indicator 8, a gate 9, and a clerk switch 10 for a clerk.

In the insertion port 2, a recording medium (passage card), e.g., a boarding ticket C, a pass D, a coupon E, a money card A, or a coupon card B as a so-called card is inserted upon entrance or exit at the gate. The money card A is a so-called prepaid card, and is a money ticket having a predetermined face value. The coupon card B is a coupon ticket having a predetermined face value. The boarding ticket C, the pass D, the coupon E, the money card A, or the coupon ticket B is ejected from the ejection port 3 upon entrance or exit at the gate. The gate 9 (or 4) blocks passage of a person who inserted the passage card A to E when he enters or exits the gate.

The display unit 5 displays the balance of the money card A, the remaining number of "coupons" (which are not actual "coupons" but are data decremented by "1" upon every use of the card) of the coupon card B, or various guide messages upon entrance or exit at the gate. The passenger detector 6 serves as a partition for discriminating a path 11 corresponding to the main body 1 of each automatic examination apparatus, and detects passage of a passenger. The passenger detector 6 consists of a plurality of detectors *6a*, . . . each of which comprises a transmission or reflection type detector. When the transmission type detector is used, light emitted from a light-emitting portion arranged on another opposing main body 1 is guided thereto.

When a child is determined on the basis of information read from the passage card A to E, the child indicator 7 is turned on. When a physically handicapped person is determined on the basis of information read from the passage card A to E, the physically handicapped person indicator 8 is turned on. The gate 4 (or 9) blocks passage of a passenger from a direction opposite to a given route.

Figure 4:
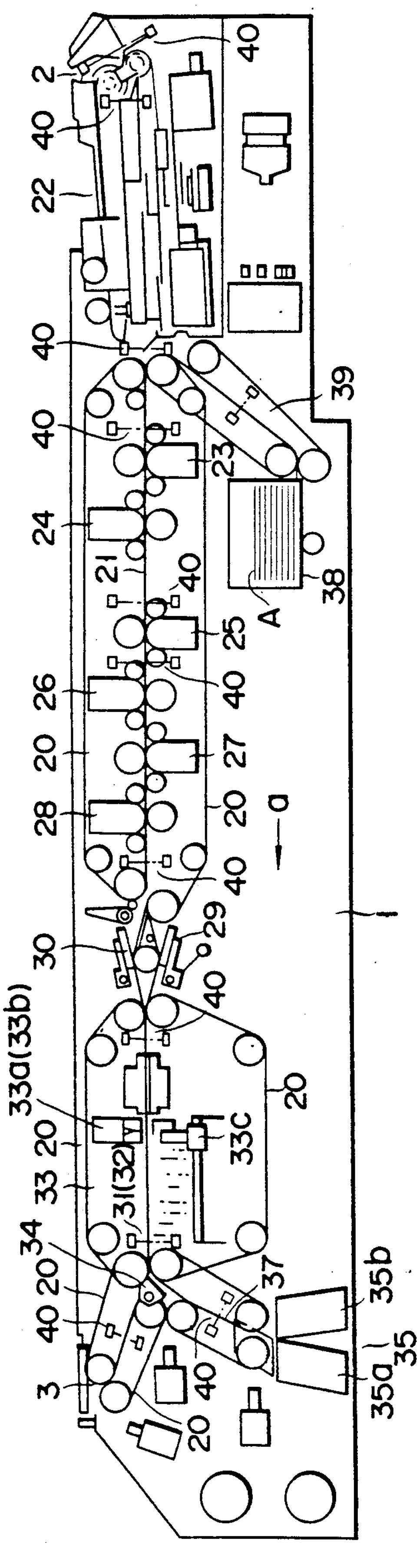
FIG. 4 is a side view showing an internal structure of the automatic examination apparatus.

FIG. 4 shows a schematic arrangement of an internal mechanism of the main body 1.

The passage card A to E inserted from the insertion port 2 is conveyed in a direction of an arrow along a convey path 21 by conveyance means, e.g., a conveyor belt 20, and the like.

A registration unit 22, a read head 23, a read head 24, a write head 25, a write head 26, a read head 27, a read head 28, a thermal head 29, a thermal head 30, a punching unit 33, punch hole detectors 31 and 32, and a branch unit 34 are arranged along the convey path 21 in this order from the insertion port 2 side.

The passage card A to E is registered by the registration unit 22. The read head 23 reads magnetic information on the lower surface of the ticket A or the like. The read head 24 reads magnetic information on the upper surface of the passage card A to E. The write head 25 writes magnetic information on the lower surface of the passage card A to E. The write head 26 writes magnetic information on the upper surface of the passage card A to E.

The read head 27 reads the magnetic information written on the lower surface of the passage card A to E by the write head 25. The read head 28 reads the magnetic information written on the upper surface of the passage card A to E by the write head 26. The thermal head 29 prints print information on the lower surface of the passage card A to E. The thermal head 30 prints print information on the upper surface of the passage card A to E.

The punching unit 33 punches a hole indicating start of use and a hole indicating "used" in one end portion, i.e., an end portion perpendicular to the convey direction or the other end portion on the money card A or the coupon card B. The punching unit 33 comprises two punches 33*a* and 33*b*, and a stopper 33*c*.

The punch hole detectors 31 and 32 detect whether or not holes are punched in one end portion, i.e., the end portion perpendicular to the convey direction or the other end portion on the money card A or the coupon card B.

A recovery unit 36 comprising two ticket collection units 35*a* and 35*b* is arranged below the branch unit 34. The passage card A to E branched from the convey path 21 by the branch unit 34, i.e., a used ticket is guided to the ticket collection units 35*a* and 35*b* through a branch convey path 37.

A money card stacking unit 38 for stacking new money cards A is arranged below the read heads 23 and 24. The money card A fed from the money card stacking unit 38 by a feed unit (not shown) is conveyed to a position corresponding to the registration unit 22 on the convey path 21 through a feed convey path 39.

Note that detectors 40, . . . for detecting passage of the passage card A to E are arranged on the convey paths 21 and 37.

The boarding ticket C (not shown) is issued by an automatic ticket machine (not shown).

A place of purchase, date of purchase, section information, physically handicapped person discount information, identification information of adult or child, and the like of the ticket are printed on the front surface of the boarding ticket C.

A magnetic recording portion (not shown) consisting of magnetic bar codes or the like is provided on the rear surface of the boarding ticket C.

Magnetic information, i.e., so-called machine-readable information, recorded on the magnetic recording portion consists of a place of purchase, date of purchase, section information, physically handicapped person discount information, identification information of adult or child, and the like recorded by the automatic ticket machine, and a date, time, starting station, entrance data, machine number and the like recorded by the automatic examination apparatus upon entrance.

Figure 5:
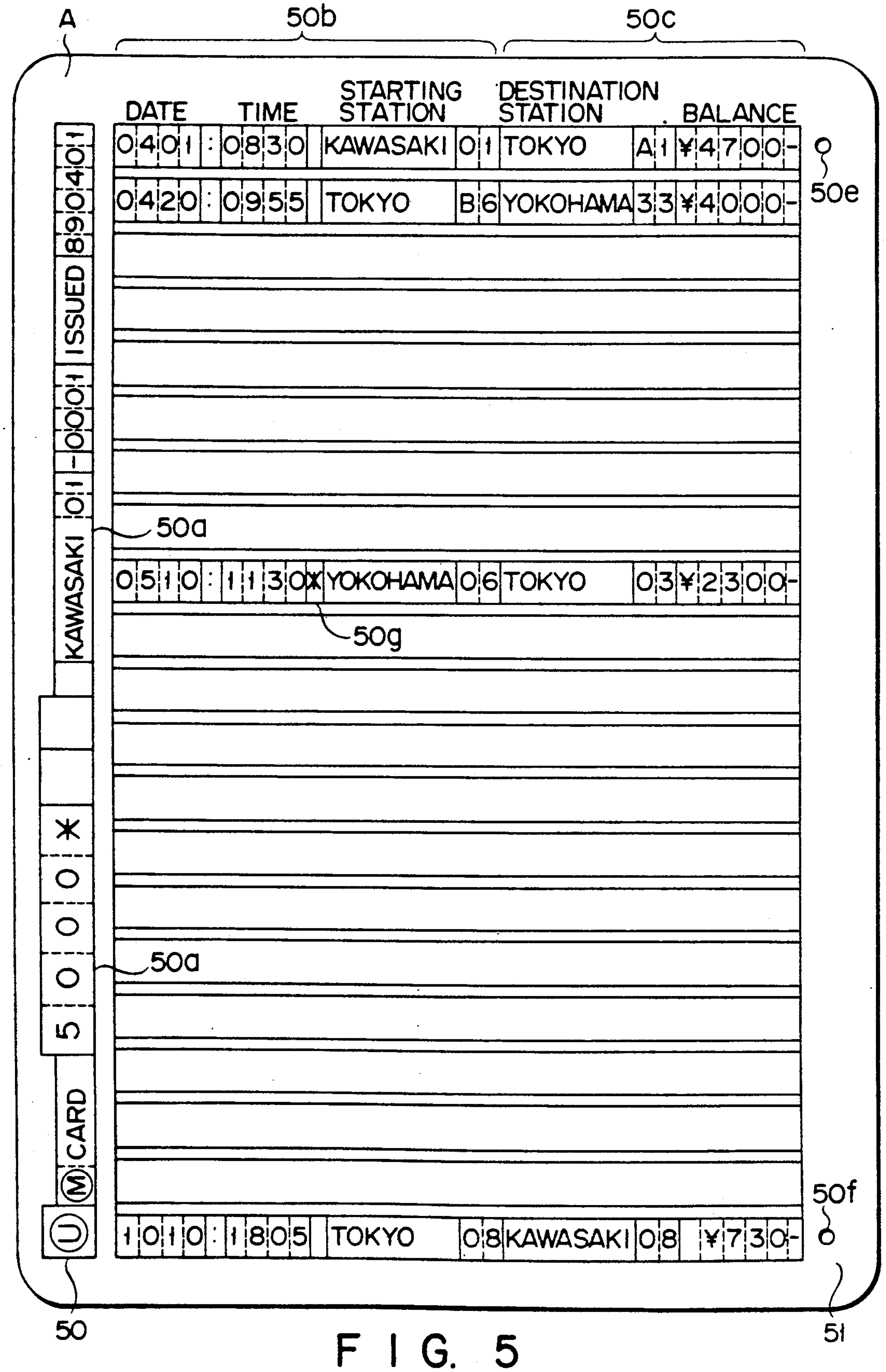
FIG. 5 is a plan view showing a print sample of a money card.

FIG. 5 shows a format of the money card A.

A recording area 50*a* and printing areas 50*b* and 50*c* are provided on a surface 51 of the money card A.

A place of purchase, date of purchase, prepaid amount upon purchase, and the money card A are recorded in advance on the recording area 50*a*. Entrance information is recorded on the printing area 50*b* upon entrance in the gate, and exit information is recorded on the printing area 50*c* upon exit from the gate. A plurality of printing regions are prepared for a plurality of times of use (entrance and exit).

A pair of entrance information and exit information are recorded for a single use (entrance and exit).

A date of use, time, discount mark (*) 50*g*, a starting station as an entrance mark, and a type of machine, e.g., a machine number of the automatic ticket machine or the automatic examination apparatus are printed on the entrance information printing area 50*b*.

A destination station as an exit mark, a type of machine, e.g., a machine number of the automatic ticket machine or the automatic examination apparatus, and a balance are printed on the exit information printing area 50*c*.

A recording area 50*d* to which a "used" mark is printed when the printing regions are full is provided on the surface 51 of the money card A.

The discount mark 50*g* is printed when entrance time is in a specific time-of-day (9:30 to 16:30), and indicates a discount of a fare.

A hole 50*e* indicating start of use or a hole 50*f* indicating "used" is formed on the surface 51 of the money card A.

A magnetic recording portion (not shown) consisting of magnetic bar codes or the like is provided on the rear surface of the money card A.

Magnetic information, i.e., so-called machine-readable information, recorded on the magnetic recording portion consists of a date, time, starting station as a place of entrance, entrance data, and machine number which are recorded by the automatic examination apparatus upon entrance, and a destination station as a place of exit, exit data recorded by erasing entrance data, machine number, information indicating whether or not a fare is discounted, and balance which are recorded by the automatic examination apparatus upon exit, and data indicating a money card, face value data, and manufacturing number which are recorded in advance.

Information is magnetically recorded on the magnetic recording portion by an F2F method, and consists of 8 tracks. A set of 4 or 8 bits in each track has a meaning as one byte or word of data.

Figure 6:
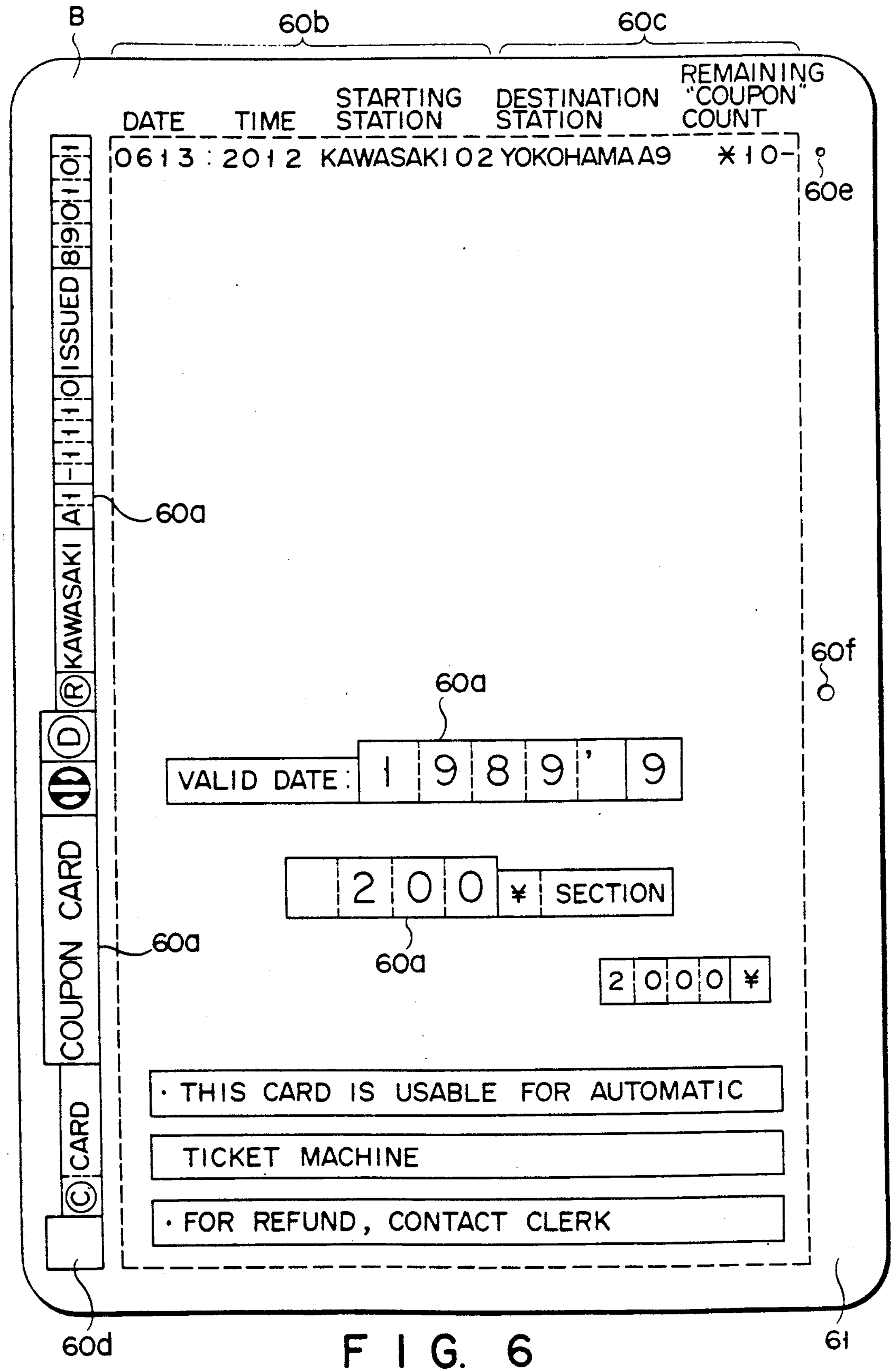
FIG. 6 is a plan view showing a print sample of a coupon card.

FIG. 6 shows a format of the coupon card B.

A recording area 60*a* and printing areas 60*b* and 60*c* are provided on a surface 61 of the coupon card B.

A place of purchase, date of purchase, prepaid amount upon purchase, valid date, section information, discount information, identification information of adult or child, and the coupon card B are recorded in advance on the recording area 60*a*. Entrance information is recorded on the printing area 60*b* upon entrance in the gate, and exit information is recorded on the printing area 60*c* upon exit from the gate. A plurality of printing regions corresponding to a plurality of times of use (entrance and exit) are prepared. A pair of entrance information and exit information are recorded for a single use (entrance and exit).

A date of use, time, a starting station as an entrance mark, and a type of machine, e.g., a machine number of the automatic ticket machine or the automatic examination apparatus are printed on the entrance information printing area *60b*. A destination station as an exit mark, a type of machine, e.g., a machine number of the automatic ticket machine or the automatic examination apparatus, and the remaining number of "coupons" are printed on the exit information printing area *60c*.

A recording area *60d* on which a "used" mark is printed when the printing regions are full is provided on the surface 61 of the coupon card B. A hole *60e* indicating start of use or a hole *60f* indicating "used" are formed on the surface 61 of the coupon card B.

A magnetic recording portion (not shown) consisting of magnetic bar codes or the like is provided to the rear surface of the coupon card B.

Magnetic information, i.e., so-called machine-readable information, recorded on the magnetic recording portion consists of a date, time, starting station, entrance data, machine number, and remaining number of "coupons" which are recorded by the automatic examination apparatus upon entrance, a destination station, exit data recorded by erasing the entrance data, machine number and the like which are recorded by the automatic examination apparatus upon exit, and data indicating a coupon card, face value data, valid date, section information, and manufacturing number which are recorded in advance.

Information is magnetically recorded on the magnetic recording portion by the F2F method. The magnetic recording portion consists of 8 tracks, and a set of 4 or 8 bits in each track has a meaning as data.

A magnetic recording portion (not shown) consisting of magnetic bar codes or the like is provided on the rear surface of each of the boarding ticket C, the pass D, and the coupon E.

Information is magnetically recorded on the magnetic recording portion by an NRZ-1 method. The magnetic recording portion consists of 8 tracks, and each track (8 bits) has a meaning as one byte or word of data. A recording pitch of the NRZ-1 method is larger than that of the F2F method.

Figure 7:
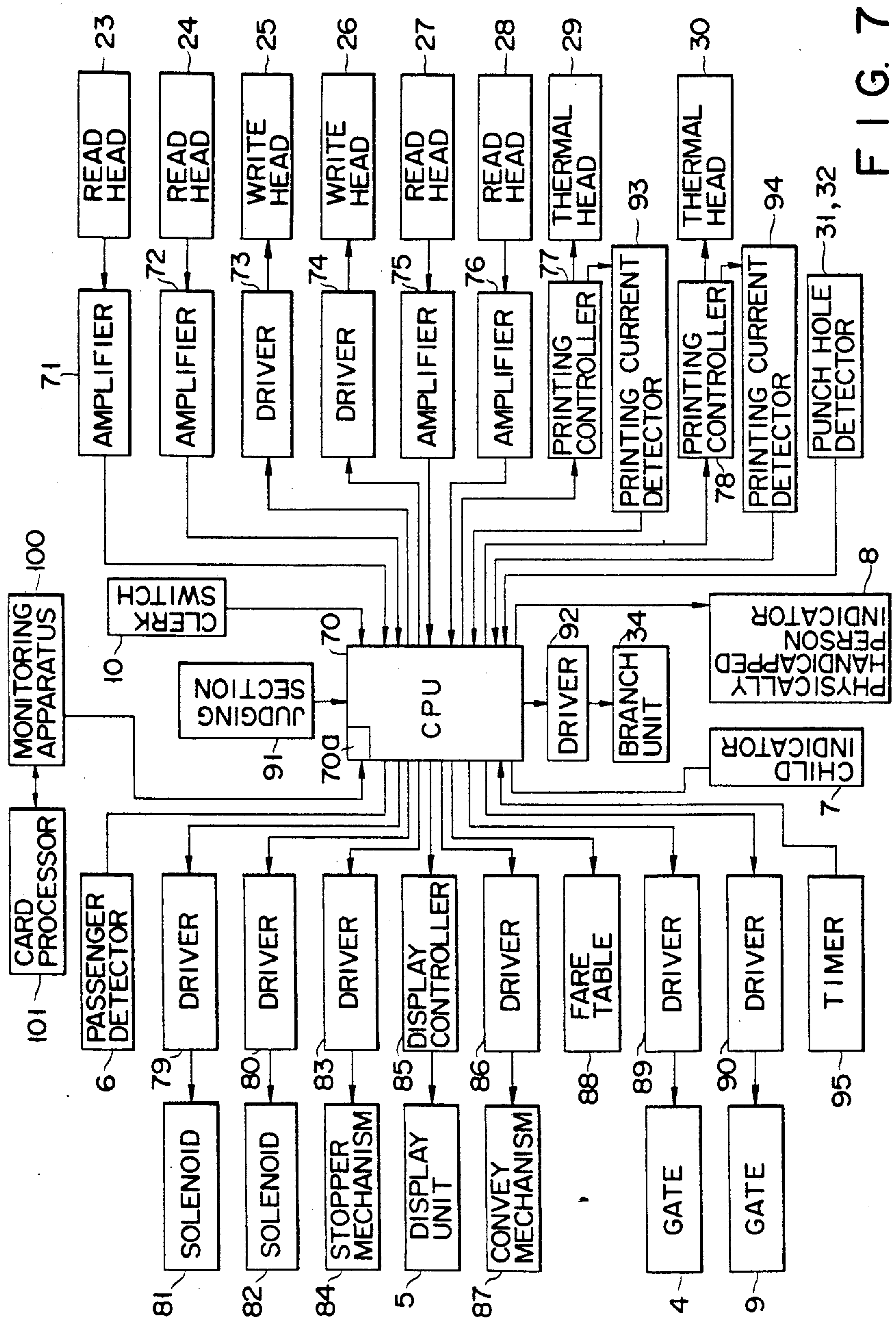
FIG. 7 is a block diagram schematically showing an arrangement of an electrical circuit of the automatic examination apparatus.

FIG. 7 is a block diagram showing an arrangement of a main part of an electrical circuit.

A CPU (Central Processing Unit) 70 controls the entire circuit. The CPU 70 is connected to amplifiers 71 and 72, drivers 73 and 74, amplifiers 75 and 76, printing controllers 77 and 78, drivers 79, 80, 83, 86, 89, 90, and 92, a display controller 85, a judging section 91, and a timer 95.

A signal from the read head 23 is amplified by the amplifier 71, and the amplified signal is sent as an output to the CPU 70. A signal from the read head 24 is amplified by the amplifier 72, and the amplified signal is sent as an output to the CPU 70. The write head 25 is driven by the driver 73 in accordance with recording data such as entrance data, date data, updating data, recovery data, and the like.

The write head 26 is driven by the driver 74 in accordance with recording data such as entrance data, date data, updating data, recovery data, and the like. A signal from the read head 27 is amplified by the amplifier 75, and the amplified signal is sent as an output to the CPU 70. A signal from the read head 28 is amplified by the amplifier 76, and the amplified signal is sent as an output to the CPU 70.

The thermal heads 29 and 30 are driven by the printing controllers 77 and 78, respectively. When the thermal head 29 or 30 is driven, a date, time, starting station, discount fare mark, destination station, machine number, and balance are printed on the money card A, and a date, time, starting station, destination station, machine number, and the remaining number of "coupons" are printed on the coupon card B.

Solenoids 81 and 82 are energized by the drivers 79 and 80 to drive the punches *33a* and *33b*, thus forming a hole indicating start of use or a hole indicating "used" on the passage card A to E. A stopper mechanism 84 for moving the stopper *33c* is driven by the driver 83. A display on the display unit 5 is controlled by the display controller 85.

A convey mechanism 87 such as the conveyor belt 20, and the like is driven by the driver 86. A fare table 88 stores fare data corresponding to various entrance station data and boarding section data supplied from the CPU 70. The boarding section data are determined in consideration of discounted or extra fares depending on boarding time zones.

For example, the fare table 88 stores non-discounted fare data and discounted fare data in correspondence with predetermined boarding sections. The non-discounted fare data are used when a boarding time is in rush hour, and the discounted fare data are used when the boarding time is in a time-of-day, e.g., "9:30 to 16:30" other than a rush hour.

The fare table 88 may store only non-discounted fare data corresponding to predetermined boarding sections. In this case, a discounted fare in a day time other than the rush hour is calculated by multiplying a predetermined discount rate with the non-discounted fare data.

The gates 4 and 9 are driven by the drivers 89 and 90. The judging section 91 judges an authenticity of each ticket or the like on the basis of time data, starting station data, entrance data, date data, and the like supplied from the CPU 70. The branch unit 34 is driven by the driver 92. Printing current detectors 93 and 94 detect whether predetermined printing currents or more of the printing controllers 77 and 78 flow. The timer 95 determines a boarding time, i.e., entrance time or exit time.

The CPU 70 is connected to the child indicator 7, the physically handicapped person indicator 8, the clerk switch 10, and the punch hole detectors 31 and 32.

The CPU 70 is connected to a monitoring apparatus 100 as an external apparatus.

The monitoring apparatus 100 is provided for a clerk who monitors states of a plurality of automatic examination apparatus main bodies 1. The apparatus 100 is equipped in a fare adjustment office and displays an amount to be adjusted upon fare adjustment of each automatic examination apparatus main body 1.

The monitoring apparatus 100 is connected to a card processor 101 which has magnetic processing, printing, and punching functions for processing the money card A in the same manner as the automatic examination apparatus main body 1.

When a clerk performs fare adjustment processing for the pass D or the coupon ticket E using the card processor 101, the entrance mark recorded on the magnetic recording portion is erased. When examination processing cannot be performed by the automatic examination apparatus main body 1, examination processing for the boarding ticket C, the pass D, the coupon ticket E, the money card A, or the coupon card B is performed by the card processor 101. More specifically, the entrance mark recorded on the magnetic recording portion of the passage card A to E is erased.

With this arrangement, examination processing operations for the boarding ticket C, the pass D, the coupon E, the money card A, and the coupon card B will be described below with reference to the flow charts shown in FIGS. 8A to 8E and 9A to 9I.

On-boarding, i.e., entrance in the gate using the boarding ticket C in a state wherein the main body 1 is used as the automatic examination apparatus for performing the entrance job will be described below. When a passenger inserts the ticket C in the insertion port 2, the ticket C is conveyed in the direction of the arrow a along the convey path 21 (ST1 in FIG. 8A).

The ticket C is registered by the registration unit 22 (registration being a matter of proper physical orientation and alignment of the ticket) and is then guided to a position opposing the read heads 23 and 24. In this case, when the rear surface, i.e., the magnetic recording surface of the ticket C faces down, the content of the magnetic recording surface is read by the read head 23. The content read by the read head 23 is supplied to the CPU 70 through the amplifier 71. The read content is stored in an internal memory 70*a* by the CPU 70 (ST2). When the magnetic recording surface faces up, the content of the magnetic recording surface is read by the read head 24. The content read by the read head 24 is supplied to the CPU 70 through the amplifier 72. The read content is stored in the internal memory 70*a* by the CPU 70 (ST2). The CPU 70 analyzes the storage content of the internal memory 70*a*, and since the recording method is the NRZ-1 method and the recording content corresponds to the ticket C, it determines that the ticket C is inserted. The CPU 70 judges an insertion direction of the ticket C based on the data content. A surface of the ticket C which faces up is determined in accordance with whether the content of the magnetic recording surface is read by the read head 23 or 24 (ST3).

The storage content of the internal memory 70*a* is processed by the CPU 70 in accordance with the determined recording method and insertion direction, so that the content of the magnetic recording portion of the ticket C, i.e., data indicating the ticket C, date data, time data, starting station data, and machine number data are judged and are sent as an output to the judging section 91. The judging section 91 judges using these data indicating the ticket C and the like whether or not the ticket C is correct (ST4 in FIG. 8A). The judging result of the judging section 91 is output to the CPU 70.

If the judging result of the judging section 91 indicates the ticket C, the CPU 70 causes the write head 25 or 26 to record the machine number and entrance data on the magnetic recording portion of the ticket C. Thereafter, the content of the magnetic recording portion of the ticket C is read by the read head 27 or 28, and the read content is supplied to the CPU 70. The CPU 70 checks if the data recorded on the ticket C are correct. If the checking result indicates that the data are correct, starting station data as entrance data is printed on the ticket C using the thermal head 29 or 30 in accordance with the insertion direction of the ticket C (ST5). The CPU 70 ejects the ticket C from the ejection port 3 while it keeps the gates 4 and 9 open (ST6). As a result, the passenger passes the path 11, and receives the ticket C.

Off-boarding, i.e., exit from the gate using the boarding ticket C in a state wherein the main body 1 is used as the automatic examination apparatus for performing exit job will be described below. When a passenger inserts the ticket C in the insertion port 2, the ticket C is conveyed in the direction of the arrow along the convey path 21 (ST101 in FIG. 9A).

The ticket C is registered by the registration unit 22, and is then guided to a position opposing the read heads 23 and 24. In this case, when the rear surface, i.e., the magnetic recording surface of the ticket C faces down, the content of the magnetic recording surface is read by the read head 23. The content read by the read head 23 is supplied to the CPU 70 through the amplifier 71. The read content is stored in the internal memory 70*a* by the CPU 70 (ST102).

When the rear surface, i.e., the magnetic recording surface of the ticket C faces up, the content of the magnetic recording surface is read by the read head 24. The content read by the read head 24 is supplied to the CPU 70 through the amplifier 72. The read content is stored in the internal memory 70*a* by the CPU 70 (ST102).

The CPU 70 analyzes the storage content of the internal memory 70*a*, and since the recording method is the NRZ-1 method and the recording content corresponds to the ticket C, it determines that the ticket C is inserted. The CPU 70 judges an insertion direction of the ticket C based on the data content. A surface of the ticket C which faces up is determined in accordance with whether the content of the magnetic recording surface is read by the read head 23 or 24 (ST103).

The storage content of the internal memory 70*a* is processed by the CPU 70 in accordance with the determined recording method and insertion direction, so that the content of the magnetic recording portion of the ticket C, i.e., data indicating the ticket C, date data, time data, starting station data, and machine number data are judged and are sent as an output to the judging section 91. The judging section 91 judges using these data indicating the ticket C and the like whether or not the ticket C is correct (ST104 in FIG. 9A). In this case, it is checked if a passenger enters and exits on the same day, and it is checked if the passenger exits after the lapse of too much time with respect to a standard moving time. The judging result of the judging section 91 is output to the CPU 70.

The CPU 70 checks on the basis of the supplied machine number and entrance data if the passenger legally entered a gate of the starting station previously (ST105). More specifically, the entrance data is added to the immediately preceding data by the CPU 70. If the entrance data is not erased, legal boarding is determined. If the entrance data is not added, i.e., is already erased, illegal boarding is determined.

If legal boarding is determined, the CPU 70 keeps the gates 4 and 9 open, i.e., permits passage of the passenger, and recovers the ticket C in the ticket collection unit 35*a* or 35*b* (ST107).

If it is determined upon judgment of the ticket C that the passenger got off beyond his destination on the ticket, the CPU 70 stops the ticket C on the convey path 21, and closes the gate 4 to block passage of the passenger, i.e., to inhibit exit (ST108). In this case, the CPU 70 causes the display unit 5 to display an amount to be adjusted with a sign "−" and a guide message "insert a money card to adjust a fare" (ST109).

Figure 9A:
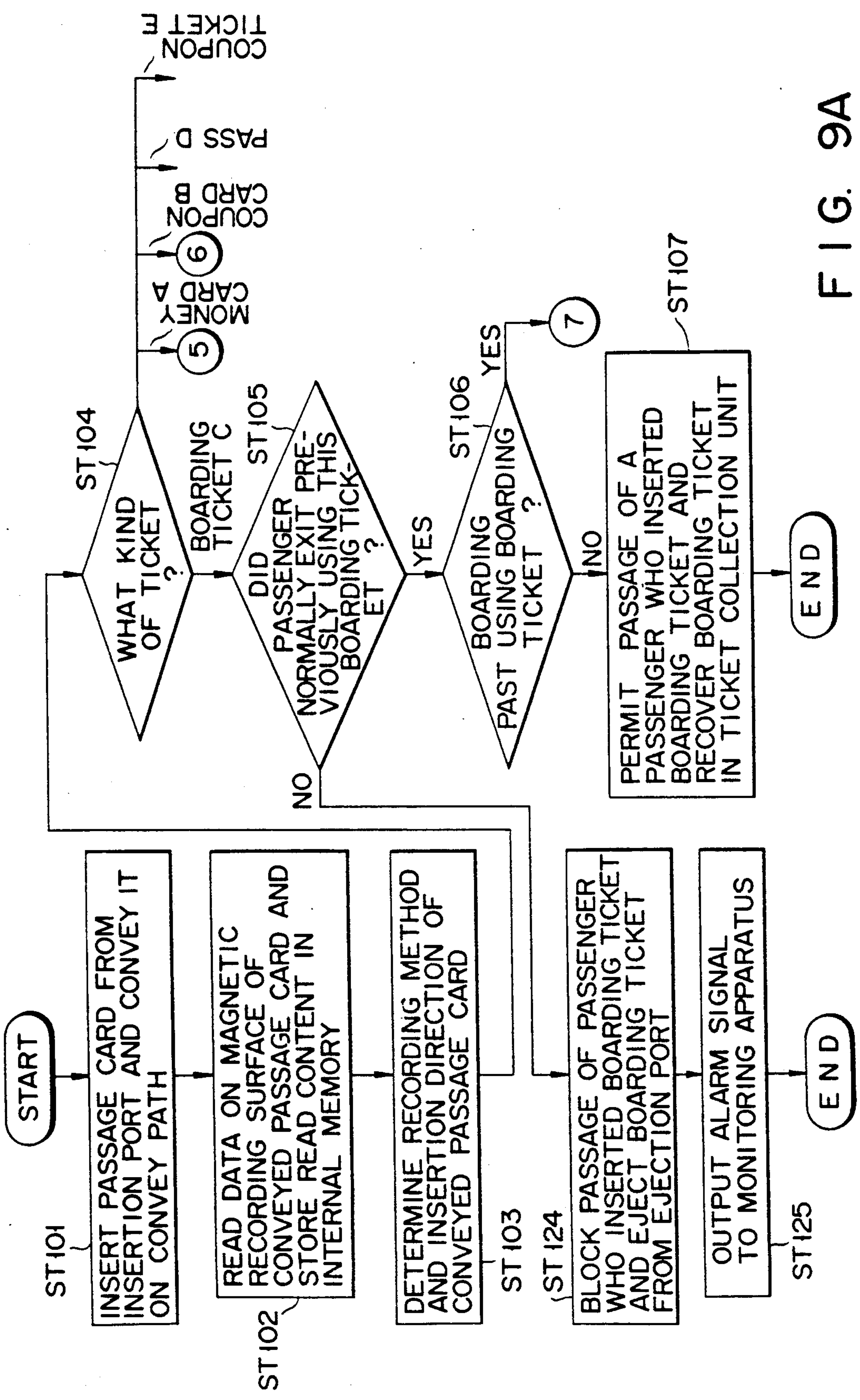
FIGS. 9A, 9B, 9C, 9D, 9E, 9F, 9G, 9H, and 9I are flow charts for explaining an exit operation from the gate.
Figure 9B:
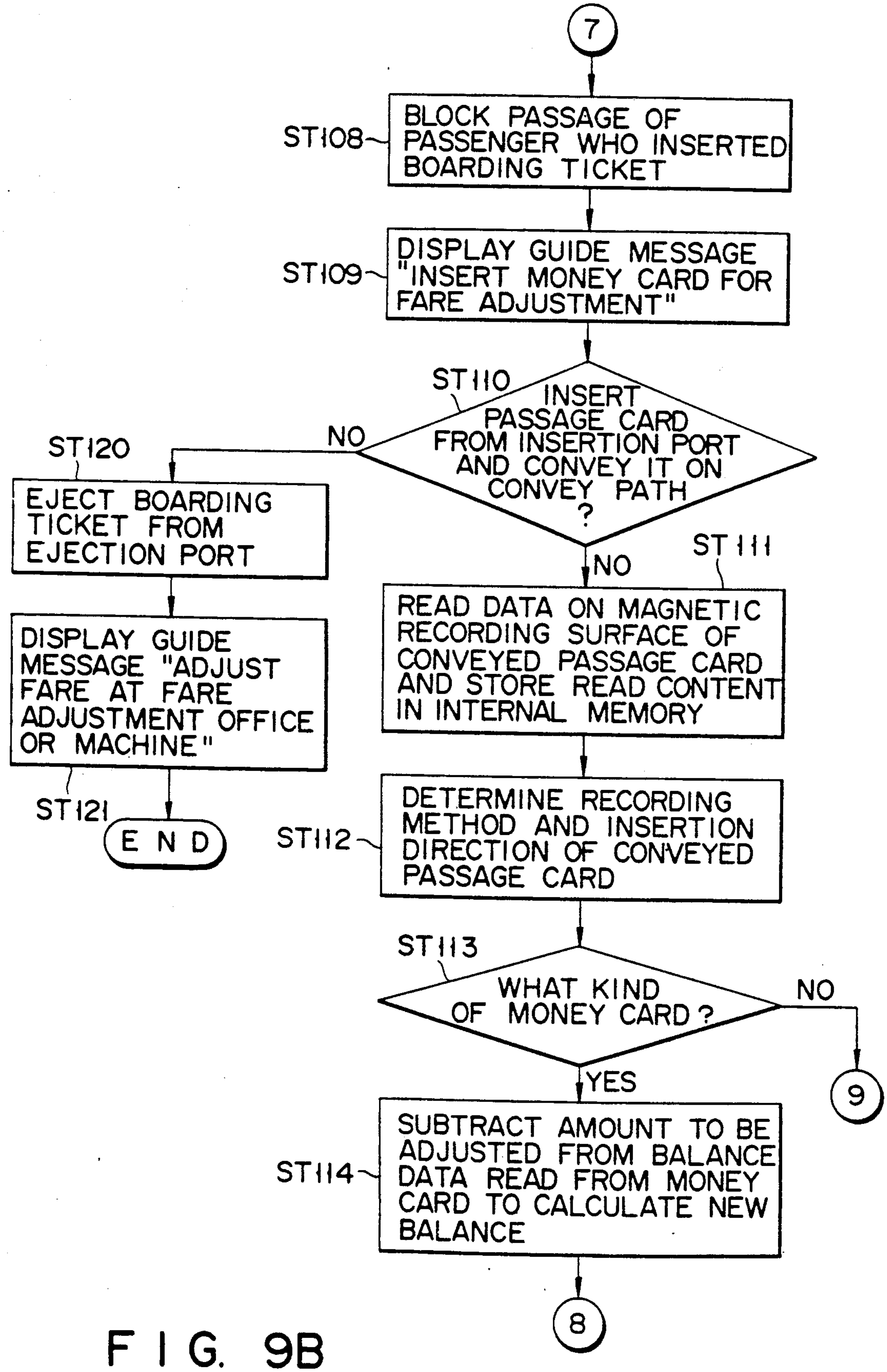
Figure 9C:
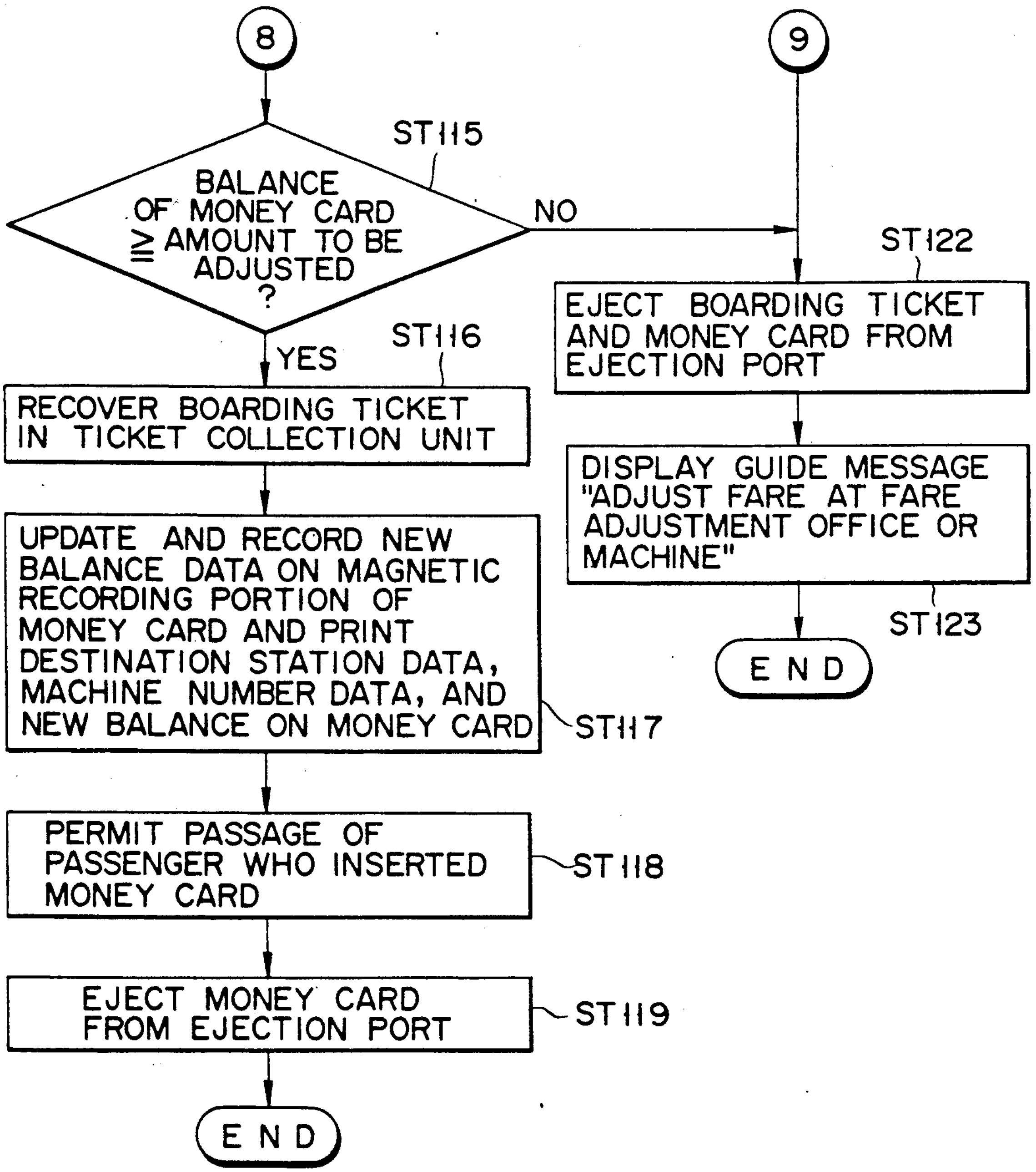

When the passenger inserts the money card A from the insertion port 2 according to this guide message, the insertion of the money card A is judged by the CPU 70 (ST110 in FIG. 9B). The money card A is conveyed in the direction of the arrow a on the convey path 21 in response to the CPU 70. The money card A is registered by the registration unit 22, and is then guided to a position opposing the read heads 23 and 24. In this case, when the rear surface, i.e., the magnetic recording surface of the money card A faces down, the magnetic recording content is read by the read head 23. The content read by the read head 23 is supplied to the CPU 70 through the amplifier 71. The CPU 70 stores the read content in the internal memory 70*a* (ST111).

When the rear surface, i.e., the magnetic recording surface of the money card A faces up, the content of the magnetic recording surface is read by the read head 24. The content read by the read head 24 is supplied to the CPU 70. The CPU 70 stores the read content in the internal memory 70*a* (ST111).

The CPU 70 analyzes the storage content of the internal memory 70*a*. If the CPU 70 determines that the recording method is the F2F method and the recording content corresponds to that of the money card, it is determined that the money card A is inserted. The CPU 70 determines an insertion direction of the money card A on the basis of the data content. A surface of the money card A which faces up is then determined in accordance with whether the content is read by the read head 23 or 24 (ST112).

When the pitch of the recording bits is small and 4 or 8 bits in the longitudinal direction form significant data, the CPU 70 determines the F2F method. The insertion direction of the money card A is determined in accordance with the data content, and a surface of the money card A which faces up is then determined in accordance with whether the content is read by the read head 23 or 24.

The storage content of the internal memory 70*a* is processed in accordance with the determined recording method and insertion direction, so that the content of the magnetic recording portion of the money card A, i.e., the data indicating the money card A and balance data are checked. The checking result is sent as an output to the judging section 91. The judging section 91 checks using the data indicating the money card A and the like whether or not the money card A is correct (ST113). The judging result of the judging section 91 is sent as an output to the CPU 70.

If it is determined that the correct money card A is inserted, the CPU 70 subtracts the amount to be adjusted from the balance data read from the money card A to calculate a new balance (ST114).

If the balance of the money card A is larger than the amount to be adjusted (ST115 in FIG. 9C), the CPU 70 recovers the ticket C in the ticket correction unit 35*a* or 35*b* (ST116), and causes the display unit 5 to display the calculated new balance. The CPU 70 updates and records the content of the money card A, i.e, the balance data using the write head 25 or 26 in accordance with the insertion direction of the money card A (ST117 in FIG. 9C).

Thereafter, the content of the magnetic recording portion of the money card A is read by the read head 27 or 28 in accordance with the insertion direction of the money card A, and the read content is supplied to the CPU 70. The CPU 70 then checks if the data updated and recorded on the magnetic recording portion is correct. If it is determined that the data is correct, destination station data, machine number data, and new balance are printed on the money card A using the thermal head 29 or 30 according to the insertion direction (ST117). The CPU 70 then opens the gate 4, i.e., permits passage of the passenger (ST118), and ejects the money card A from the ejection port 3 (ST119). As a result, the passenger passes the path 11, and receives the ejected money card A.

If the money card A is not inserted after the lapse of a predetermined period of time from the insertion guide message of the money card A in step 110, the CPU 70 ejects the ticket C from the ejection port 3 (ST120). The CPU 70 causes the display unit 5 to display a guide message "bring the ticket C and adjust the fare at the fare adjustment office or machine" (ST121).

If insertion of the money card A is not determined in step 113 of FIG. 9B or if the balance of the money card A is smaller than the amount to be adjusted in step 115, the CPU 70 ejects the ticket C and the money card A from the ejection port 3 (ST122), and causes the display unit 5 to display a guide message "bring the ticket C and adjust the fare at the fare adjustment office or machine" (ST123).

The passenger receives the ejected ticket C and brings it to a clerk, i.e., the fare adjustment office in accordance with the guide message. In this case, the clerk adjusts the fare in accordance with the amount to be adjusted displayed on the monitoring apparatus 100.

When the pass D, the coupon E, or the coupon card B is used, the fare adjustment processing can be performed using the money card A in the same manner as for the ticket C. In this case, the pass D is returned to the passenger after the entrance data of the magnetic recording portion is erased. When a passenger does not have the money card A upon fare adjustment and brings the ejected pass D to the clerk, i.e., to the fare adjustment office, the clerk adjusts the fare in accordance with the amount to be adjusted displayed on the monitoring apparatus 100, and the entrance data of the magnetic recording portion is erased by the card processor 101.

If illegal boarding is determined in step 105 of FIG. 9A based on the fact that no entrance data is recorded, the CPU 70 ejects the ticket C from the ejection port 3, and closes the gate 4, thus blocking passage of the passenger (ST124 of FIG. 9A). In this case, the CPU 70 outputs an alarm signal to the monitoring apparatus 100 (ST125).

As a result, the clerk confirms whether or not starting station data as entrance data is printed on the returned ticket C, and if he confirms that the data is normally printed, the passenger is allowed to exit the gate.

When the starting station data as the entrance data is not recorded, the clerk executes processing for illegal boarding. In this case, both the clerk and the passenger can visually confirm whether or not the date and the starting station data as the entrance data are recorded. Therefore, since illegal boarding can be confirmed not only mechanically but also visually, no quarrel occurs.

On-boarding, i.e., entrance in the gate using the money card A in a state wherein the main body 1 is used as the automatic examination apparatus for performing entrance job will be described below. When a passenger inserts the money card A in the insertion port 2, the money card A is conveyed in the direction of the arrow a along the convey path 21 (ST1 of FIG. 8A).

The money card A is registered by the registration unit 22, and is then guided to a position opposing the read heads 23 and 24. In this case, when the rear surface, i.e., the magnetic recording surface of the money card A faces down, the content of the magnetic recording surface is read by the read head 23. The content read by the read head 23 is supplied to the CPU 70 through the amplifier 71. The read content is stored in the internal memory 70*a* by the CPU 70 (ST2).

When the rear surface, i.e., the magnetic recording surface of the money card A faces up, the content of the magnetic recording surface is read by the read head 24. The content read by the read head 24 is supplied to the CPU 70 through the amplifier 72. The read content is stored in the internal memory 70*a* by the CPU 70 (ST2).

The CPU 70 analyzes the storage content of the internal memory 70*a*, and since the recording method is the F2F method and the recording content corresponds to the money card A, it determines that the money card A is inserted (ST3).

More specifically, when the pitch of the recording bits is small and 4 or 8 bits in the longitudinal direction form significant data, the F2F method is determined. The insertion direction of the money card A is determined based on the data content. A surface of the money card A which faces up is determined in accordance with whether the content of the magnetic recording surface is read by the read head 23 or 24 (ST3).

The storage content of the internal memory 70*a* is processed by the CPU 70 in accordance with the determined recording method and insertion direction, so that the content of the magnetic recording portion of the money card A, i.e., data indicating the money card A, manufacturing number, date data, time data, starting station data, machine number data, and balance data are judged and are output to the judging section 91. The judging section 91 judges using these data indicating the money card A and the like whether or not the money card A is correct (ST4). The judging result of the judging section 91 is output to the CPU 70.

Figure 8A:
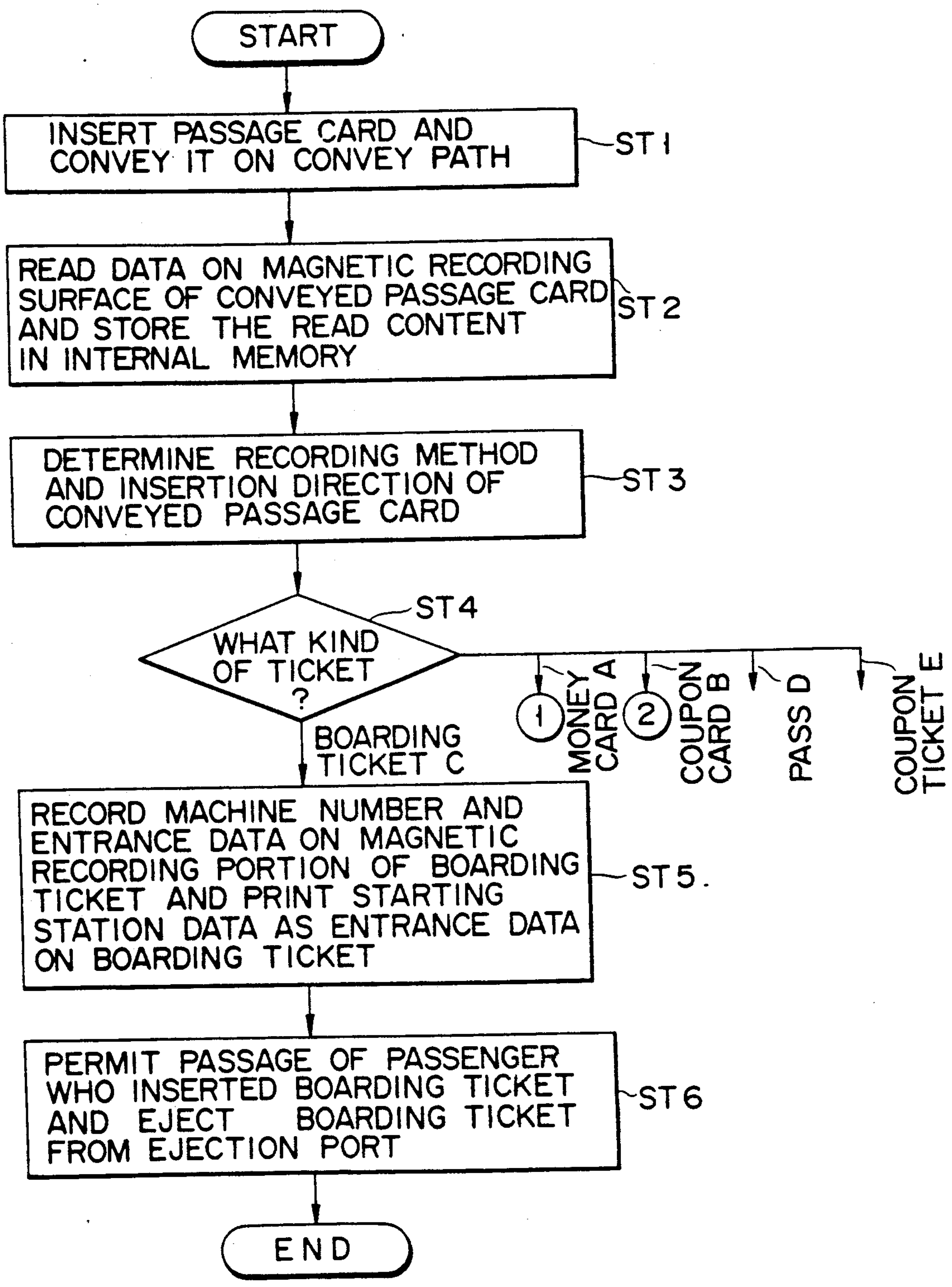
FIGS. 8A, 8B, 8C, 8D, and 8E are flow charts for explaining an entrance operation from a gate.
Figure 8B:
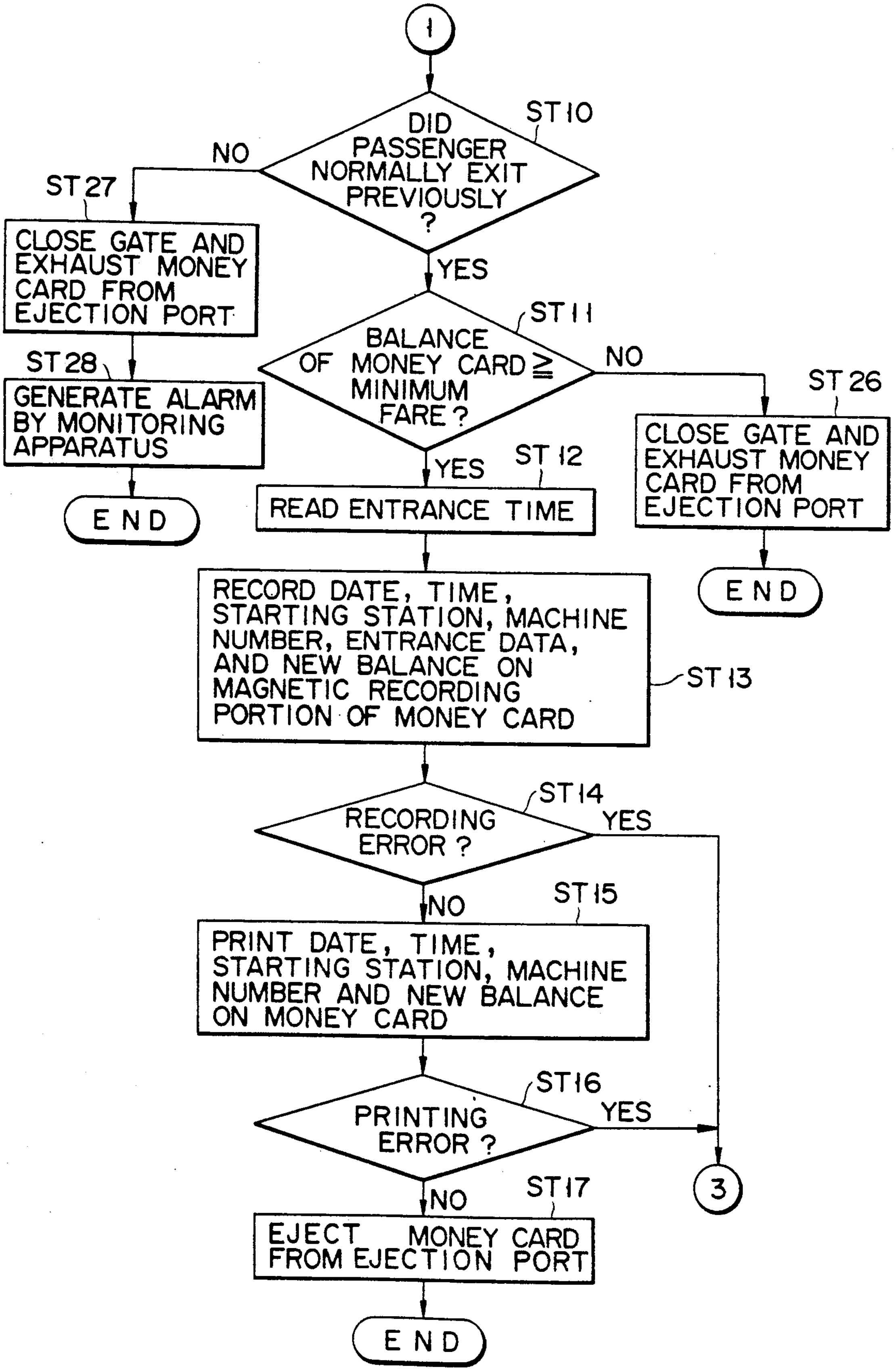

It is then checked on the basis of the machine number and exit data supplied from the CPU 70 if a passenger normally exited previously (ST10 in FIG. 8B). More specifically, when entrance data is erased in correspondence with the examination apparatus finally used except for a new card, it is determined that the passenger normally exited. If the entrance data is not erased, illegal boarding, i.e., so-called illegal use is determined.

If it is determined in step 10 that the passenger normally exited, the CPU 70 checks if the balance of the money card A reaches a minimum fare (ST11), and reads the entrance time from the timer 95 (ST12). If the CPU 70 determines that the balances reaches the minimum fare, date, time, starting station, machine number, and entrance data are recorded on the magnetic recording portion of the money card A using the write head 25 or 26 in accordance with the insertion direction, and an amount calculated by subtracting the minimum fare from the current balance is recorded as a new balance (ST13).

Thereafter, the content of the magnetic recording portion of the money card A is read by the read head 27 or 28, and is supplied to the CPU 70. The CPU 70 then checks if the data recorded on the money card A are correct (ST14). If it is determined that the data are correct, the date, time, starting station as entrance data, and the number of this examination apparatus, i.e., machine number are visually printed on the entrance information printing area 50*b* (ST15). When the boarding time is in the specific time zone, e.g., 9:30 to 16:30, the discount mark 50*g* is printed. The CPU 70 checks based on the detection output from the printing current detector 93 or 94 whether or not the data are normally printed on the money card A (ST16). In this case, the CPU 70 causes the display unit 5 to display the new balance.

If it is determined in step 16 that the data are normally printed, the CPU 70 keeps the gates 4 and 9 open, allows the passenger to pass the gate, and ejects the money card A from the ejection port 3 (ST17). As a result, the passenger passes the path 11, and receives the money card A.

Figure 8C:
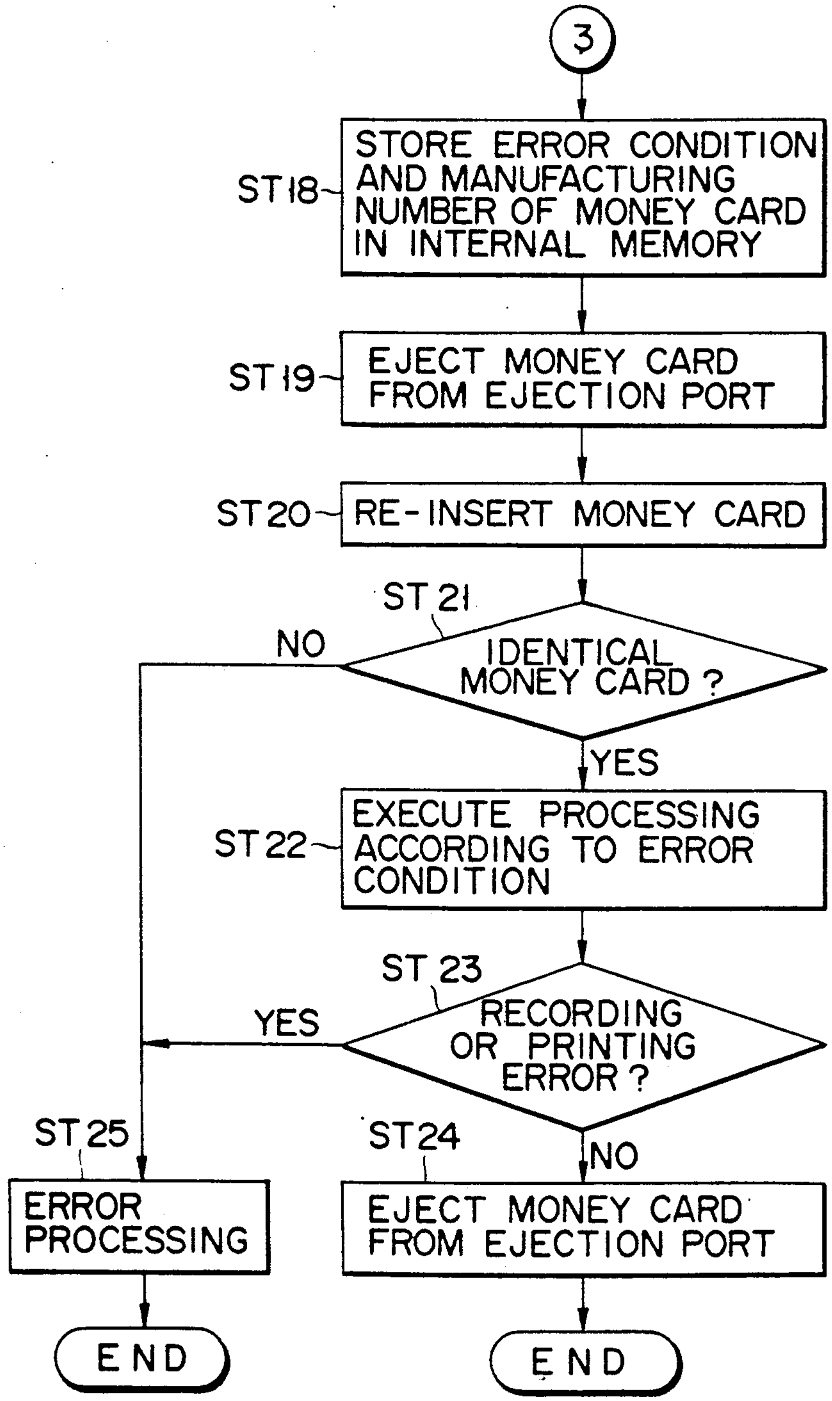

If it is determined in step 14 that the data are not normally magnetically recorded or it is determined in step 16 that the data are not normally printed, the CPU 70 stores the error condition and the manufacturing number of the presently processed money card A in the internal memory 70*a* (ST18 of FIG. 8C). As the error condition, when the data are not normally magnetically recorded, data indicating retry from magnetic recording is stored. When the data are not normally printed although they are normally magnetically recorded, data indicating retry from printing is stored.

The CPU 70 closes the gate 4, and conveys and ejects the money card A from the ejection port 3 (ST19). In this case, the CPU 70 causes the display unit 5 to display a guide message "machine error, please insert the card from the insertion port again".

The passenger inserts again the money card A ejected from the ejection port 3 into the insertion port 2 in accordance with this guide message (ST20). Upon card insertion, insertion of the money card A and its insertion direction are determined in the same manner as in the first insertion described above. The CPU 70 compares the manufacturing number read from the presently inserted money card A and that of the money card A ejected due to the error to check if the identical card is inserted. If it is determined that the identical money card A is inserted, the CPU 70 executes processing according to the error condition stored in the internal memory 70*a* (ST22).

For example, when the data are not normally magnetically recorded, magnetic recording and printing are performed. When the data are not normally printed although they are normally magnetically recorded, only the printing is performed.

When the magnetic recording and/or printing are/is performed in accordance with the error condition, the gate 4 is opened, i.e., passage of the passenger is allowed, and the money card A is ejected from the ejection port 3 (ST24). As a result, the passenger passes the path 11, and receives the money card A.

When the identical money card A is not inserted (ST21) or when an error for magnetic recording or printing is detected again (ST23), error processing, e.g., clerk calling, is executed (ST25).

If it is determined in step 11 of FIG. 8B that the balance does not reach the minimum fare, the CPU 70 causes the display unit 5 to display a balance before the minimum fare is subtracted therefrom, and a guide message. In this case, the CPU 70 closes the gate 4, conveys the money card A on the convey path 21, and ejects it from the ejection port 3 (ST26).

If illegal boarding is determined in step 10, the CPU 70 conveys the money card A on the convey path 21 and exhausts it from the exhaust port 3, and closes the gate 4, thus blocking passage of the passenger (ST27). The CPU 70 causes the monitoring apparatus 100 to generate an alarm (ST28).

As a result, a clerk confirms whether or not destination station data as exit data is printed on the exit information printing area 50*c* corresponding to an immediately preceding use of the returned money card A. If the data is normally printed, the clerk inserts the money card A in the card processor 101. The card processor 101 prints the date, time, starting station, and machine number on the entrance information printing area 50*b* of the money card A, records the date, time, starting station, machine number, and entrance data on the magnetic recording portion, and updates and records balance data by subtracting the minimum fare from it. The money card A is returned to the passenger, and the clerk permits the passenger to pass the path 11 (FIG. 3).

When the destination station data as the exit data is not recorded on the exit information printing area 50*c*, the clerk performs processing for illegal boarding. In this case, both the clerk and the passenger can visually confirm whether or not the destination station data as the exit data are recorded on the exit information printing area 50*c*. Therefore, since illegal boarding can be confirmed not only mechanically but also visually, no quarrel occurs.

Off-boarding, i.e., exit from the gate using the money card A in a state wherein the main body 1 is used as the automatic examination apparatus for performing the exit examination will be described below with reference to FIGS. 9A–9I. When a passenger inserts the money card A in the insertion port 2, the money card A is conveyed in the direction of the arrow a along the convey path 21 (ST101 in FIG. 9A).

The money card A is registered by the registration unit 22, and is then guided to a position opposing the read heads 23 and 24. In this case, when the rear surface, i.e., the magnetic recording surface of the money card A faces down, the content of the magnetic recording surface is read by the read head 23. The content read by the read head 23 is supplied to the CPU 70 through the amplifier 71. The read content is stored in the internal memory 70*a* by the CPU 70 (ST102). When the rear surface, i.e., the magnetic recording surface of the money card A faces up, the content of the magnetic recording surface is read by the read head 24. The content read by the read head 24 is supplied to the CPU 70 through the amplifier 72. The read content is stored in the internal memory 70*a* by the CPU 70 (ST102).

The CPU 70 analyzes the storage content of the internal memory 70*a*, and since the recording method is the F2F method and the recording content corresponds to the money card A, it determines that the money card A is inserted (ST103).

More specifically, when the pitch of the recording bits is small and 4 or 8 bits in the longitudinal direction form significant data, the F2F method is determined. Insertion of the money card A is determined by this data. The insertion direction of the money card A is determined in accordance with the content of the data, and a surface facing up is determined in accordance with whether the content is read by the read head 23 or 24 (ST103).

The storage content of the internal memory 70*a* is processed by the CPU 70 in accordance with the determined recording method and insertion direction, so that the content of the magnetic recording portion of the money card A, i.e., data indicating the money card A, manufacturing number, date data, time data, starting station data, machine number data, and balance data are read and are output to the judging section 91. The judging section 91 judges using these data indicating the money card A and the like whether or not the money card A is correct (ST104). The judging result of the judging section 91 is output to the CPU 70. In this case, it is checked if a passenger enters and exits on the same day, and it is checked if the passenger exits after the lapse of too much time with respect to a standard moving time.

Figure 9D:
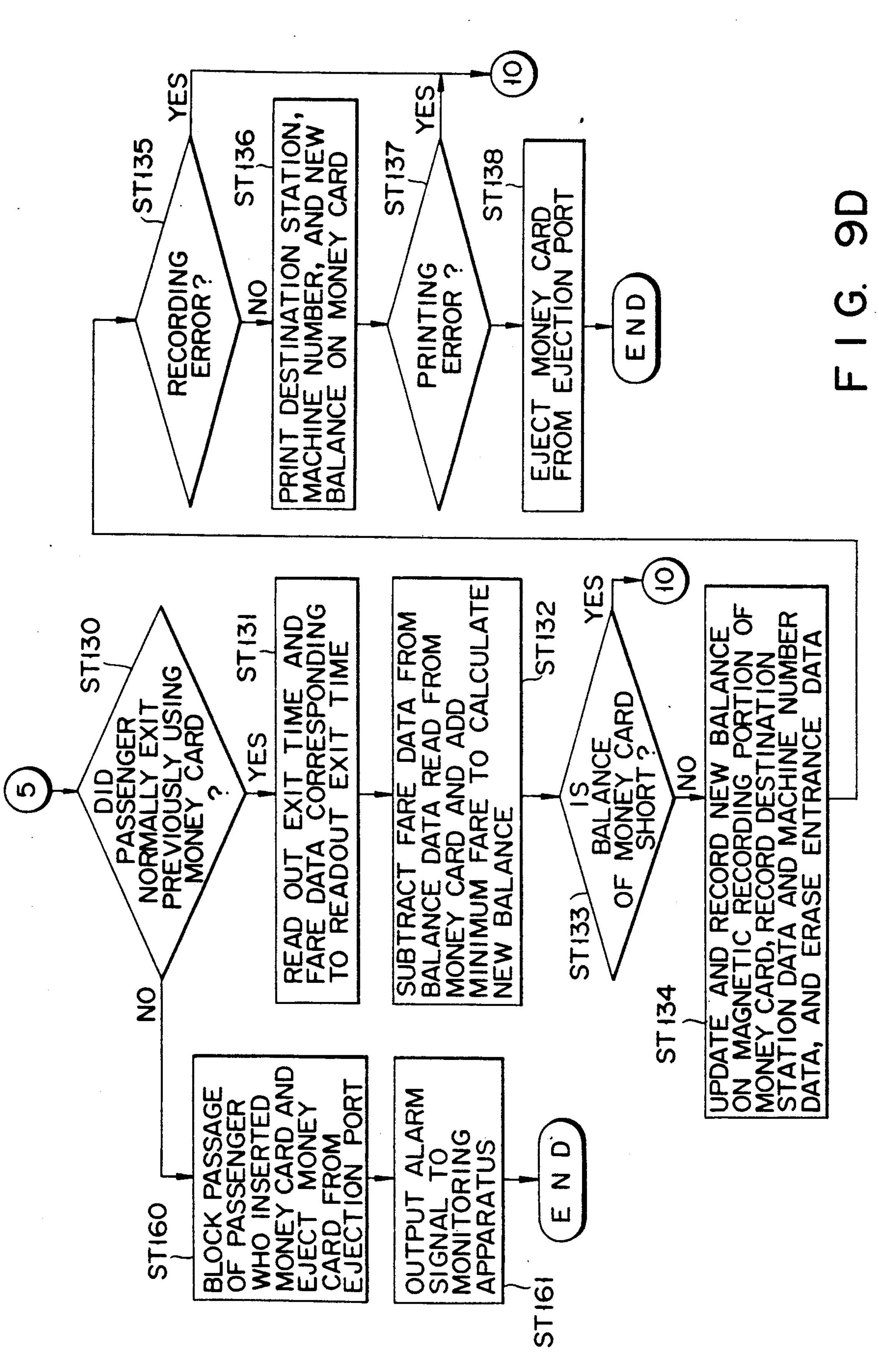

The CPU 70 checks on the basis of the supplied machine number and entrance data if the passenger normally entered a gate of the starting station previously (ST130 in FIG. 9D). More specifically, the entrance data is provided to the immediately preceding data. If the entrance data is not erased by the CPU 70, normal boarding is determined. If the entrance data is not provided, i.e., erased, illegal boarding is determined.

If normal boarding using the money card A is determined in step 130, the CPU 70 reads out exit time from the timer 95, and reads out a fare as a necessary amount from the starting station to the destination station, i.e., from the entrance station of the money card A to the station equipped with this examination apparatus from the fare table 88 (ST131).

For example, when the boarding time determined based on the exit time is in a time-of-day, e.g., "9:30 to 16:30", other than rush hour a fare obtained by discounting the fare from the entrance station to the station equipped with this examination apparatus with a predetermined discount rate is read out from the fare table 88 as fare data. In rush hour, the fare from the entrance station to the station equipped with this examination apparatus is read out from the fare table 88 as the fare data.

The CPU subtracts the fare as the necessary amount from the balance of the money card A, and adds the minimum fare which has been subtracted in advance upon entrance, thus calculating a new balance (ST132 in FIG. 9D).

For example, in rush hour, the fare from the entrance station to the station equipped with this examination apparatus is subtracted from the balance, and the minimum fare is added to the balance to calculate the new balance. In the specific time-of-day, e.g., 9:30 to 16:30, a fare obtained by discounting the fare from the entrance station to the station equipped with this examination apparatus with the predetermined discount rate is subtracted from the balance, and the minimum fare is added to the difference, thus calculating the new balance.

If the CPU 70 determines that the new balance is positive (ST133), the new balance is displayed on the display unit 5, and the content of the magnetic recording unit, i.e., the balance data is updated and recorded using the write head 25 or 26 according to the insertion direction. In addition, the destination station data and machine number data are recorded, and entrance data is deleted (ST134).

Thereafter, the content of the magnetic recording portion of the money card A is read by the read head 27 or 28 according to the insertion direction of the money card A, and is supplied to the CPU 70. The CPU 70 checks if the data updated and recorded on the magnetic recording portion are correct (ST135). If it is determined that the data are correct, the destination station data, machine number data, and new balance are printed on the money card A using the thermal head 29 or 30 according to the insertion direction (ST136).

The CPU 70 checks based on the detection output from the printing current detector 93 or 94 whether or not the data are normally printed on the money card A (ST137).

If it is determined that the data are normally printed, the CPU 70 keeps the gates 4 and 9 open, i.e., allows the passenger to pass the gate, and ejects the money card A from the ejection port 3 (ST138). As a result, the passenger passes the path 11, and receives the ejected money card A.

Figure 9E:
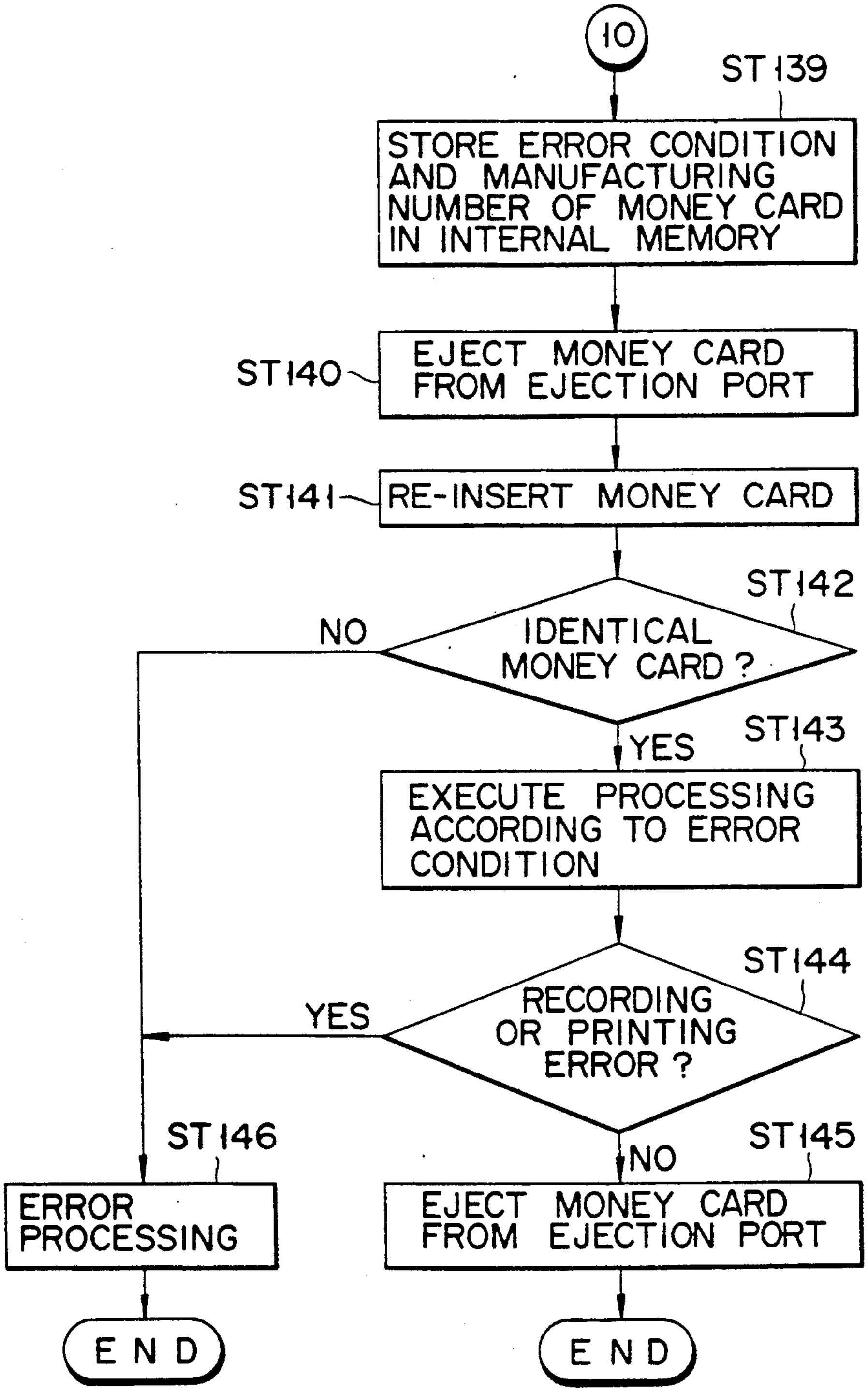

If it is determined in step 135 that the data magnetically recorded on the money card A are not correct or it is determined in step 137 that the data are not normally printed, the CPU 70 stores the error condition and the manufacturing number of the currently processed money card A in the internal memory 70*a* (ST139 of FIG. 9E).

As the error condition, when magnetic recording is not normally performed, data indicating retry from magnetic recording is stored. When printing is not normally performed although magnetic recording is normally performed, data indicating retry from printing is stored.

The CPU 70 closes the gate 4, and conveys and ejects the money card A from the ejection port 3 (ST140). In this case, the CPU 70 causes the display unit 5 to display a guide message "machine error, please insert the card from the insertion port again".

The passenger inserts again the money card A ejected from the exhaust port 3 into the insertion port 2 in accordance with this guide message (ST141). Upon card insertion, insertion of the money card A and its insertion direction are determined in the same manner as described above. The CPU 70 compares the manufacturing number read from the presently inserted money card A and that of the money card A ejected due to the error to check if the identical card is inserted (ST142).

If it is determined that the identical money card A is inserted, the CPU 70 executes processing according to the error condition stored in the internal memory 70*a* (ST143).

For example, when magnetic recording is not normally performed, magnetic recording in step 134 and printing in step 136 are similarly performed. When printing is not normally performed although magnetic recording is normally performed, only the printing in step 136 of FIG. 9D is performed.

When the magnetic recording and/or printing are/is performed in accordance with the error condition, the gate 4 is opened, i.e., passage of the passenger is allowed, and the money card A is ejected from the ejection port 3 (ST145). As a result, the passenger passes the path 11, and receives the money card A.

When the identical money card A is not inserted (ST142 of FIG. 9E) or when an error for one or both of magnetic recording and printing is detected again (ST144), error processing, e.g., clerk calling, is executed (ST146).

If it is determined in step 133 that the balance of the money card A is short, the CPU 70 causes the display unit 5 to display an amount to be adjusted with a sign "−". In this case, the CPU 70 ejects the money card A from the ejection port 3, and closes the gate 4, thus blocking the passage of the passenger.

Figure 9F:
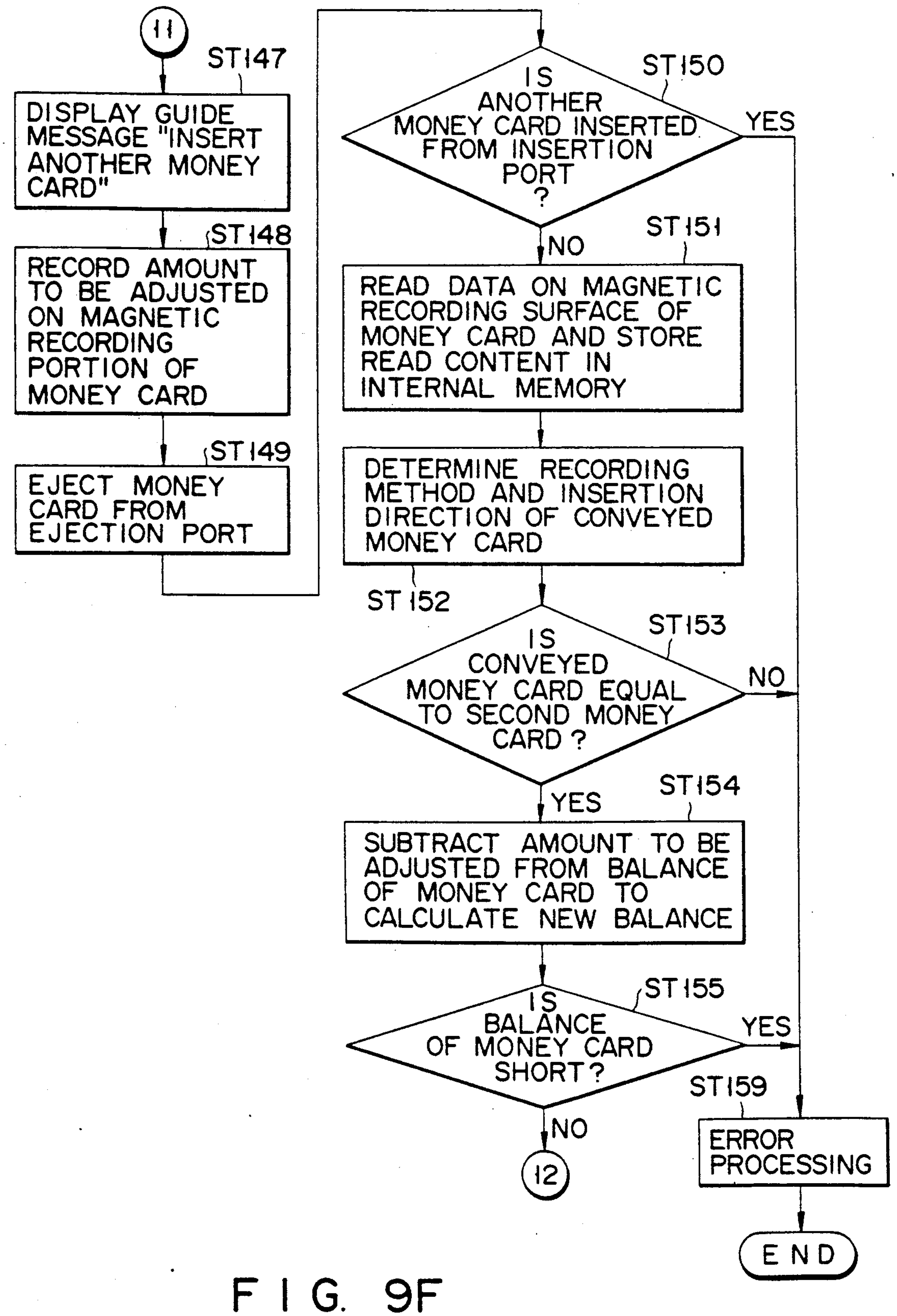
Figure 9G:
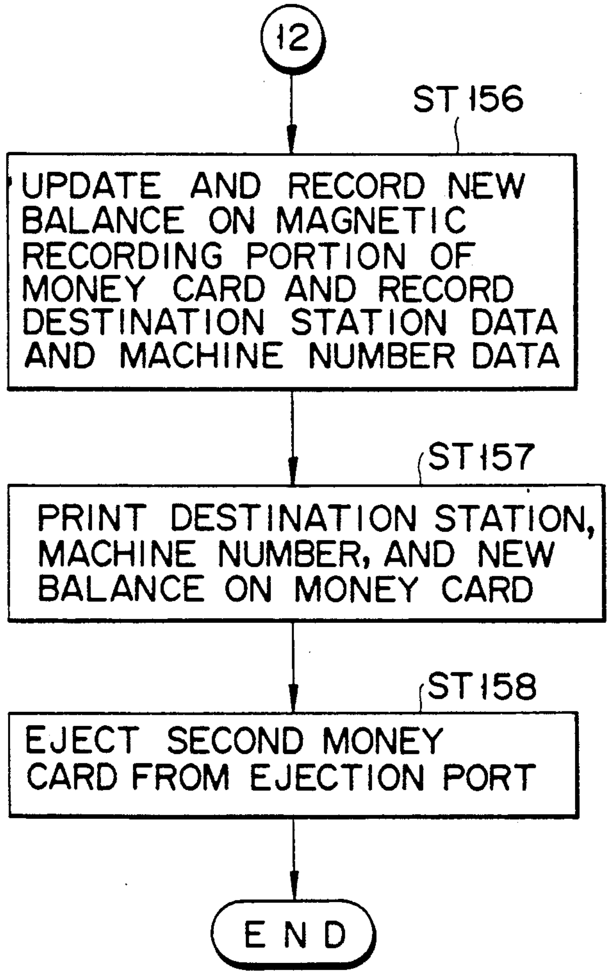

In this case, the CPU 70 causes the display unit 5 to display a guide message "insert a new money card A or bring the ejected amount card A to adjust a fare at a fare adjustment office or machine" (ST147 of FIG. 9F).

The CPU 70 writes the amount to be adjusted on the magnetic recording portion of the amount card A using the write head 25 or 26 in accordance the insertion direction (ST148). Thereafter, the money card A is ejected from the ejection port 3 (ST149).

When a new, i.e., second money card A is inserted in accordance with the guide message in step 147 (ST150), the same operations as in steps 102 and 103 are executed, so that the magnetic recording content of the money card A is read and the recording method and insertion direction are determined (ST151 and ST152).

The CPU 70 then checks if the presently inserted money card A is a new, i.e., second money card A (ST153).

If it is determined that the second money card A is inserted, the CPU 70 subtracts the amount to be adjusted from the balance data read from the presently inserted amount card A to calculate a new balance (ST154).

If the CPU 70 determines that the new balance is positive (ST155), the new balance is displayed on the display unit 5, and the content of the magnetic recording portion, i.e., the balance data is updated and recorded using the write head 25 or 26 in accordance with the insertion direction. In addition, the destination station data and machine number data are recorded (ST156 of FIG. 9G).

Thereafter, the content of the magnetic recording portion of the money card A is read by the read head 27 or 28 according to the insertion direction of the money card A, and is supplied to the CPU 70. The CPU 70 checks if the data updated and recorded on the magnetic recording portion are correct. If it is determined that the data are correct, the destination station data, machine number data, and new balance are printed on the money card A using the thermal head 29 or 30 according to the insertion direction (ST157).

The CPU 70 checks based on the detection output from the printing current detector 93 or 94 whether or not the data are normally printed on the money card A.

If it is determined that the data are normally printed, the CPU 70 keeps the gates 4 and 9 open, i.e., allows the passenger to pass the gate, and ejects the second money card A from the ejection port 3 (ST158). As a result, the passenger passes the path 11, and receives the ejected money card A.

If it is determined in step 150 that the money card A is not inserted, or it is determined in step 153 that a new money card A is not inserted, or it is determined in step 155 that the balance of the new money card A is smaller than the amount to be adjusted, error processing, e.g., clerk calling, is executed (ST159).

In accordance with the guide message in step 147, the passenger brings the ejected money card A to the clerk, i.e., to the fare adjustment office. In this case, the clerk adjusts the fare in accordance with the amount to be adjusted displayed on the monitoring apparatus 100.

If illegal boarding is determined in step 130 of FIG. 9D, the CPU 70 ejects the money card A from the ejection port 3, and closes the gate 4, thus blocking passage of the passenger (ST160). The CPU 70 causes the monitoring apparatus 100 to generate an alarm (ST161).

As a result, a clerk confirms whether or not starting station data as entrance data is printed on the entrance information printing area 50*b* of the returned money card A. If the data is normally printed, the clerk inserts the money card A in the card processor 101.

The card processor 101 prints the destination station, machine number, and new balance on the exit information printing area 50*c* of the money card A, updates and records the balance data and the like of the magnetic recording portion. The money card A is returned to the passenger, and the clerk permits the passenger to pass the path 11.

When the starting station data as the entrance data is not recorded on the entrance information printing area 50*b*, the clerk performs processing for illegal boarding. In this case, both the clerk and the passenger can visually confirm whether or not the entrance station data as the entrance data are recorded on the entrance information printing area 50*b*. Therefore, since illegal boarding can be confirmed not only mechanically but also visually, no quarrel occurs.

On-boarding, i.e., entrance in the gate using the coupon card B in a state wherein the main body 1 is used as the automatic examination apparatus for performing entrance job will be described below. When a passenger inserts the coupon card B in the insertion port 2, the coupon card B is conveyed in the direction of the arrow a along the convey path 21 (ST1 of FIG. 8A).

The coupon card B is registered by the registration unit 22, and is then guided to a position opposing the read heads 23 and 24. In this case, when the rear surface, i.e., the magnetic recording surface of the coupon card B faces down, the content of the magnetic recording surface is read by the read head 23. The content read by the read head 23 is supplied to the CPU 70 through the amplifier 71. The read content is stored in the internal memory 70*a* by the CPU 70 (ST2).

When the rear surface, i.e., the magnetic recording surface of the coupon card B faces up, the content of the magnetic recording surface is read by the read head 24. The content read by the read head 24 is supplied to the CPU 70 through the amplifier 72. The read content is stored in the internal memory 70*a* by the CPU 70 (ST2).

The CPU 70 analyzes the storage content of the internal memory 70*a*, and since the recording method is the F2F method and the recording content corresponds to the coupon card B, it determines that the coupon card B is inserted (ST3).

More specifically, when the pitch of the recording bits is small and 4 or 8 bits in the longitudinal direction form significant data, the F2F method is determined. Insertion of the coupon card B is determined based on this data. An insertion direction of the coupon card B is determined based on the content of this data. A surface of the coupon card B which faces up is determined in accordance with whether the content of the magnetic recording surface is read by the read head 23 or 24 (ST3).

The storage content of the internal memory 70*a* is processed by the CPU 70 in accordance with the determined recording method and insertion direction, so that the content of the magnetic recording portion of the coupon card B, i.e., data indicating the coupon card B, manufacturing number, date data, time data, starting station data, machine number data, section information, valid date, and remaining "coupon" count data are judged and are output to the judging section 91. The judging section 91 judges using these data indicating the coupon card B and the like whether or not the coupon card B is correct (ST4). The judging result of the judging section 91 is output to the CPU 70.

Figure 8D:
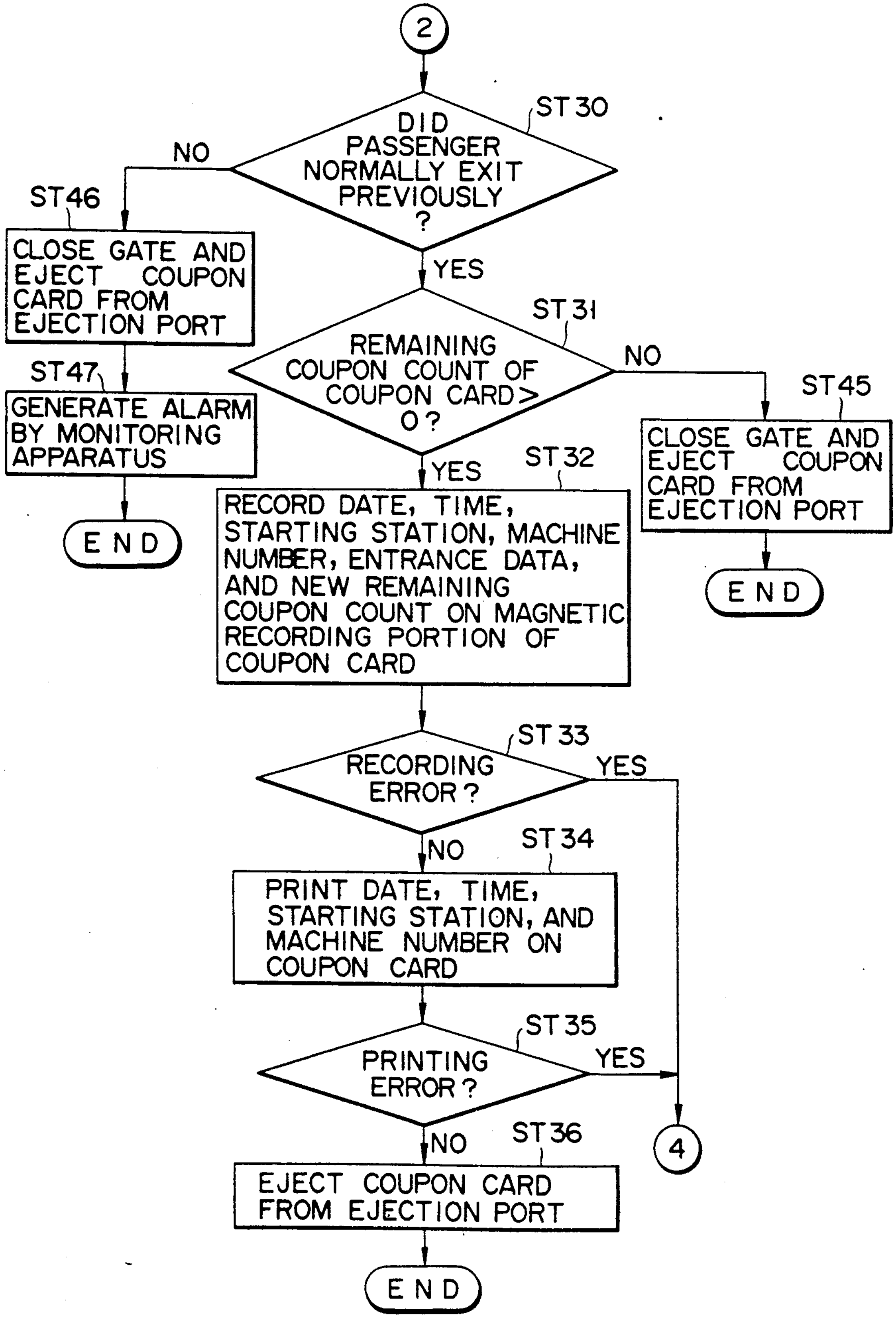

It is then checked on the basis of the machine number and exit data supplied from the CPU 70 if a passenger normally exited previously (ST30 of FIG. 8D). More specifically, when entrance data is erased in correspondence with the examination apparatus finally used except for a new card, it is determined that the passenger normally exited. If the entrance data is not erased, illegal boarding, i.e., so-called illegal use is determined.

If it is determined in step 30 that the passenger normally exited, the CPU 70 checks if there are remaining "coupons" (ST31). If the CPU 70 determines that there are the remaining "coupons", a date, time, starting station, machine number, and entrance data are recorded on the magnetic recording portion of the coupon card B using the write head 25 or 26 according to the insertion direction, and a new remaining "coupon" count obtained by decrementing the present "coupon" count by "1" is recorded (ST32).

Thereafter, the content of the magnetic recording portion the coupon card B is read by the read head 27 or 28, and is supplied to the CPU 70. The CPU 70 then checks if the data recorded on the coupon card B are correct (ST33). If it is determined that the data are correct, a date, time, starting station as entrance data, and number of the examination apparatus, i.e., machine number are visually printed on the entrance information printing area 60*b* using the thermal head 29 or 30 according to the insertion direction of the coupon card B (ST34). The CPU 70 checks based on the detection output from the printing current detector 93 or 94 whether or not the data are normally printed on the coupon card B (ST35). In this case, the CPU 70 causes the display unit 5 to display the new "coupon" count.

If it is determined in step 35 that the data are normally printed, the CPU 70 keeps the gates 4 and 9 open, i.e., allows passage of the passenger, and ejects the coupon card B from the ejection port 3 (ST36). As a result, the passenger passes the path 11, and receives the coupon card B.

Figure 8E:
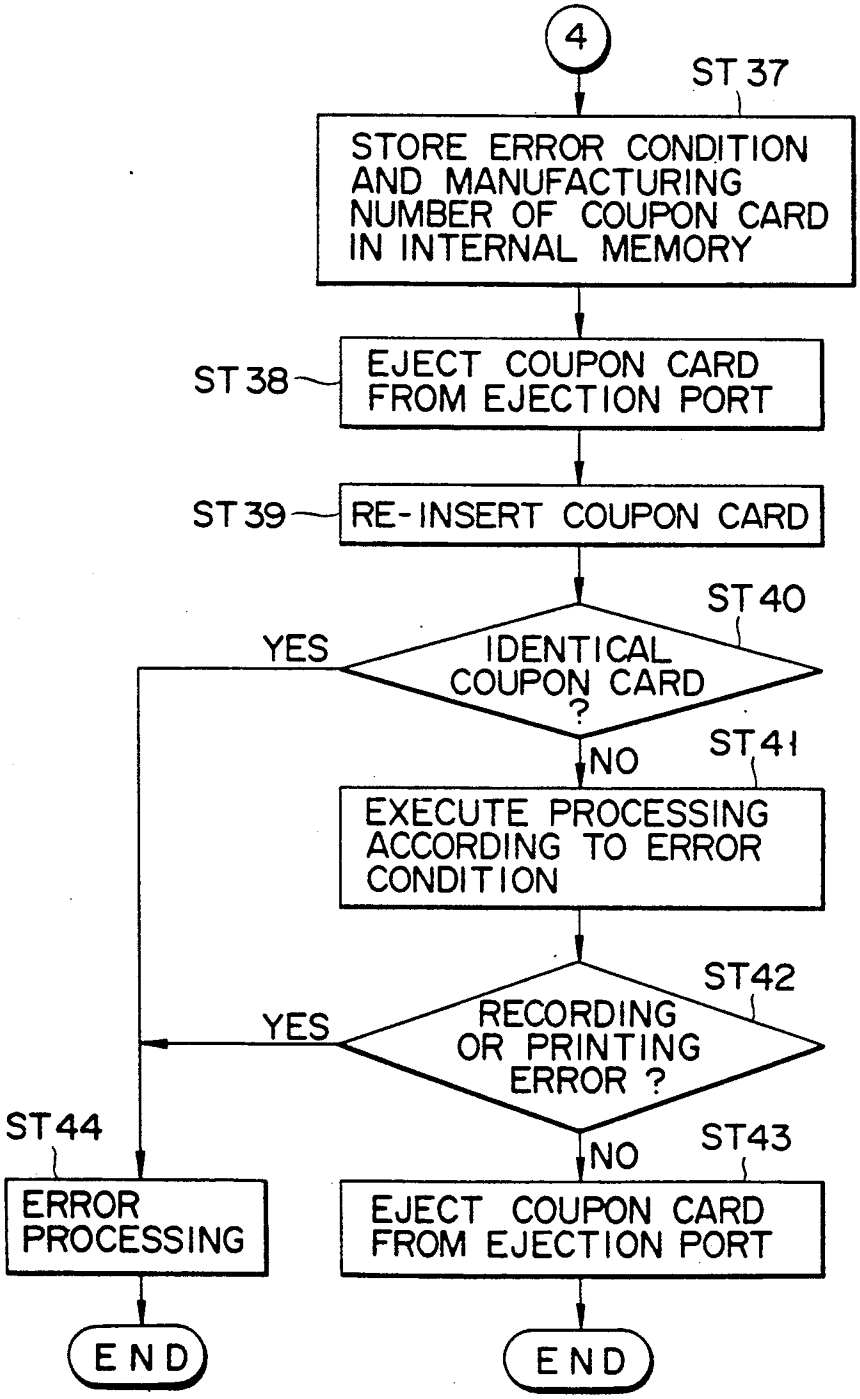

If it is determined in step 33 that the data are not normally magnetically recorded or it is determined in step 35 that the data are not normally printed, the CPU 70 stores the error condition and the manufacturing number of the presently processed coupon card B in the internal memory 70*a* (ST37 in FIG. 8E). As the error condition, when the data are not normally magnetically recorded, data indicating retry from magnetic recording is stored. When the data are not normally printed although they are normally magnetically recorded, data indicating retry from printing is stored.

The CPU 70 closes the gate 4, and conveys and ejects the coupon card B from the ejection port 3 (ST38). In this case, the CPU 70 causes the display unit 5 to display a guide message "machine error, please insert the card from the insertion port again"

The passenger inserts again the coupon card B ejected from the exhaust port 3 into the insertion port 2 in accordance with this guide message (ST39). Upon card insertion, insertion of the coupon card B and its insertion direction are determined in the same manner as in the first insertion described above. The CPU 70 compares the manufacturing number read from the presently inserted coupon card B and that of the coupon card B ejected due to the error to check if the identical card is inserted (ST40). If it is determined that the identical coupon card B is inserted, the CPU 70 executes processing according to the error condition stored in the internal memory 70*a* (ST41).

For example, when the data are not normally magnetically recorded, magnetic recording and printing are performed. When the data are not normally printed although they are normally magnetically recorded, only the printing is performed.

When the magnetic recording and/or printing are/is performed in accordance with the error condition, the gate 4 is opened, i.e., passage of the passenger is allowed, and the coupon card B is ejected from the ejection port 3 (ST43). As a result, the passenger passes the path 11, and receives the coupon card B.

When the identical coupon card B is not inserted (ST40) or when an error for magnetic recording or printing is detected again (ST42), error processing, e.g., clerk calling, is executed (ST44).

If it is determined in step 31 that there are no remaining "coupons", the CPU 70 causes the display unit 5 to flicker a remaining count "0". In this case, the CPU 70 closes the gate 4, and ejects the coupon card B from the ejection port 3 (ST45 in FIG. 8D).

If illegal boarding is determined in step 30, the CPU 70 conveys the coupon card B on the convey path 21 and ejects it from the ejection port 3, and closes the gate 4, thus blocking passage of the passenger (ST46). The CPU 70 causes the monitoring apparatus 100 to generate an alarm (ST47).

As a result, a clerk confirms whether or not destination station data as exit data is printed on the exit information printing area 60*c* corresponding to an immediately preceding use of the returned coupon card B. If the data is normally printed, the clerk inserts the coupon card B in the card processor 101. The card processor 101 prints the date, time, starting station, and machine number on the entrance information printing area 60*b* of the coupon card B, records the date, time, starting station, machine number, and entrance data on the magnetic recording portion, and updates and records the remaining "coupon" count by decrementing it by "1". The coupon card B is returned to the passenger, and the clerk permits the passenger to pass the path 11.

When the destination station data as the exit data is not recorded on the exit information printing area 60*c*, the clerk performs processing for illegal boarding. In this case, both the clerk and the passenger can visually confirm whether or not the destination station data as the exit data are recorded on the exit information printing area 60*c* corresponding to the immediately preceding use. Therefore, since illegal boarding can be confirmed not only mechanically but also visually, no quarrel occurs.

Off-boarding, i.e., exit from the gate using the coupon card B in a state wherein the main body 1 is used as the automatic examination apparatus for performing exit job will be described below. When a passenger inserts the coupon card B in the insertion port 2, the coupon card B is conveyed in the direction of the arrow a along the convey path 21 (ST101 in FIG. 9A).

The coupon card B is registered by the registration unit 22, and is then guided to a position opposing the read heads 23 and 24. In this case, when the rear surface, i.e., the magnetic recording surface of the coupon card B faces down, the content of the magnetic recording surface is read by the read head 23. The content read by the read head 23 is supplied to the CPU 70 through the amplifier 71. The read content is stored in the internal memory 70*a* by the CPU 70 (ST102). When the rear surface, i.e., the magnetic recording surface of the coupon card B faces up, the content of the magnetic recording surface is read by the read head 24. The content read by the read head 24 is supplied to the CPU 70 through the amplifier 72. The read content is stored in the internal memory 70*a* by the CPU 70 (ST102).

The CPU 70 analyzes the storage content of the internal memory 70*a*, and since the recording method is the F2F method and the recording content corresponds to the coupon card B, it determines that the coupon card B is inserted (ST103).

More specifically, when the pitch of the recording bits is small and 4 or 8 bits in the longitudinal direction form significant data, the F2F method is determined. Insertion of the coupon card B is determined by this data. The insertion direction of the coupon card B is determined in accordance with the content of the data, and a surface facing up is determined in accordance with whether the content is read by the read head 23 or 24 (ST103).

The storage content of the internal memory 70*a* is processed by the CPU 70 in accordance with the determined recording method and insertion direction, so that the content of the magnetic recording portion of the coupon card B, i.e., data indicating the coupon card B, manufacturing number, section information, valid date, date data, time data, starting station data, machine number data, remaining "coupon" count data and entrance data are read and are output to the judging section 91. The judging section 91 judges using these data indicating the coupon card B, valid date, and the like whether or not the coupon card B is correct, i.e., whether the coupon card B is still valid and the destination station falls within the boarding section (ST104). The judging result of the judging section 91 is output to the CPU 70. In this case, it is checked if a passenger enters and exits on the same day, and it is checked if the passenger exits after the lapse of too much time with respect to a standard moving time.

Figure 9H:
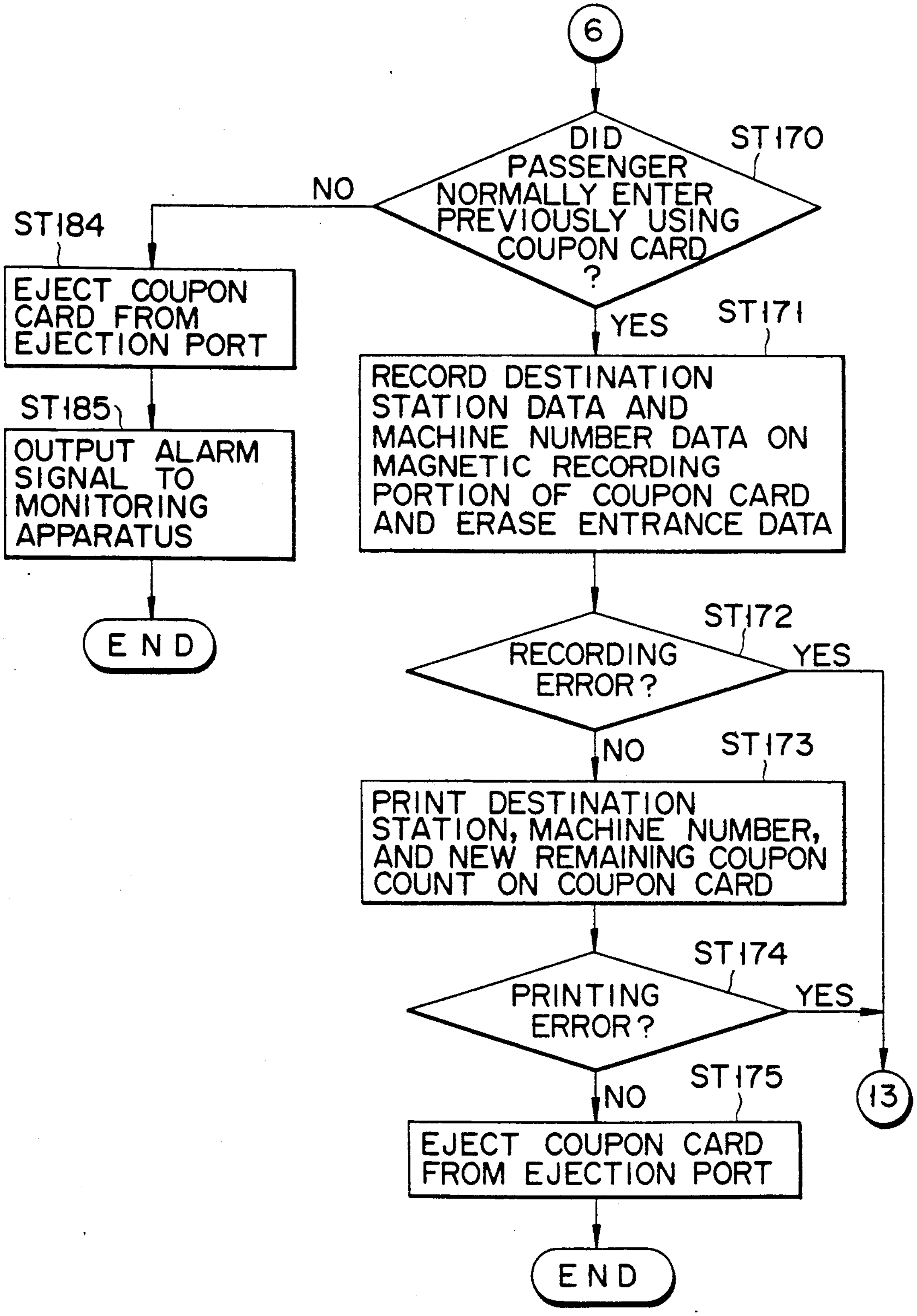

The CPU 70 checks on the basis of the supplied machine number and entrance data if the passenger normally entered a gate of the starting station previously (ST170 in FIG. 9H). More specifically, the entrance data is provided to the immediately preceding data. If the entrance data is not erased by the CPU 70, normal boarding is determined. If the entrance data is not provided, i.e., erased, illegal boarding is determined.

If normal boarding using the coupon card B is determined, the CPU 70 causes the display unit 5 to display the remaining coupon count, and records the content of the magnetic recording portion, i.e., the destination station data and machine number data using the write head 25 or 26 according to the insertion direction and erases the entrance data (ST171).

Thereafter, the content of the magnetic recording portion of the coupon card B is read by the read head 27 or 28 according to the insertion direction of the coupon card B, and is supplied to the CPU 70. The CPU 70 then checks if the data updated and recorded on the magnetic recording portion are correct (ST172). If it is determined that the data are correct, the destination station, machine number, and remaining "coupon" count are visually printed on the exit information printing area 60*c* using the thermal head 29 or (ST173).

The CPU 70 checks based o the detection output from the printing current detector 93 or 94 whether or not the data are normally printed on the coupon card B (ST174).

The CPU 70 keeps the gates 4 and 9 open, i.e., allows passage of the passenger, and ejects the coupon card B from the ejection port 3 (ST175). As a result, the passenger passes the path 11, and receives the coupon card B.

Figure 9I:
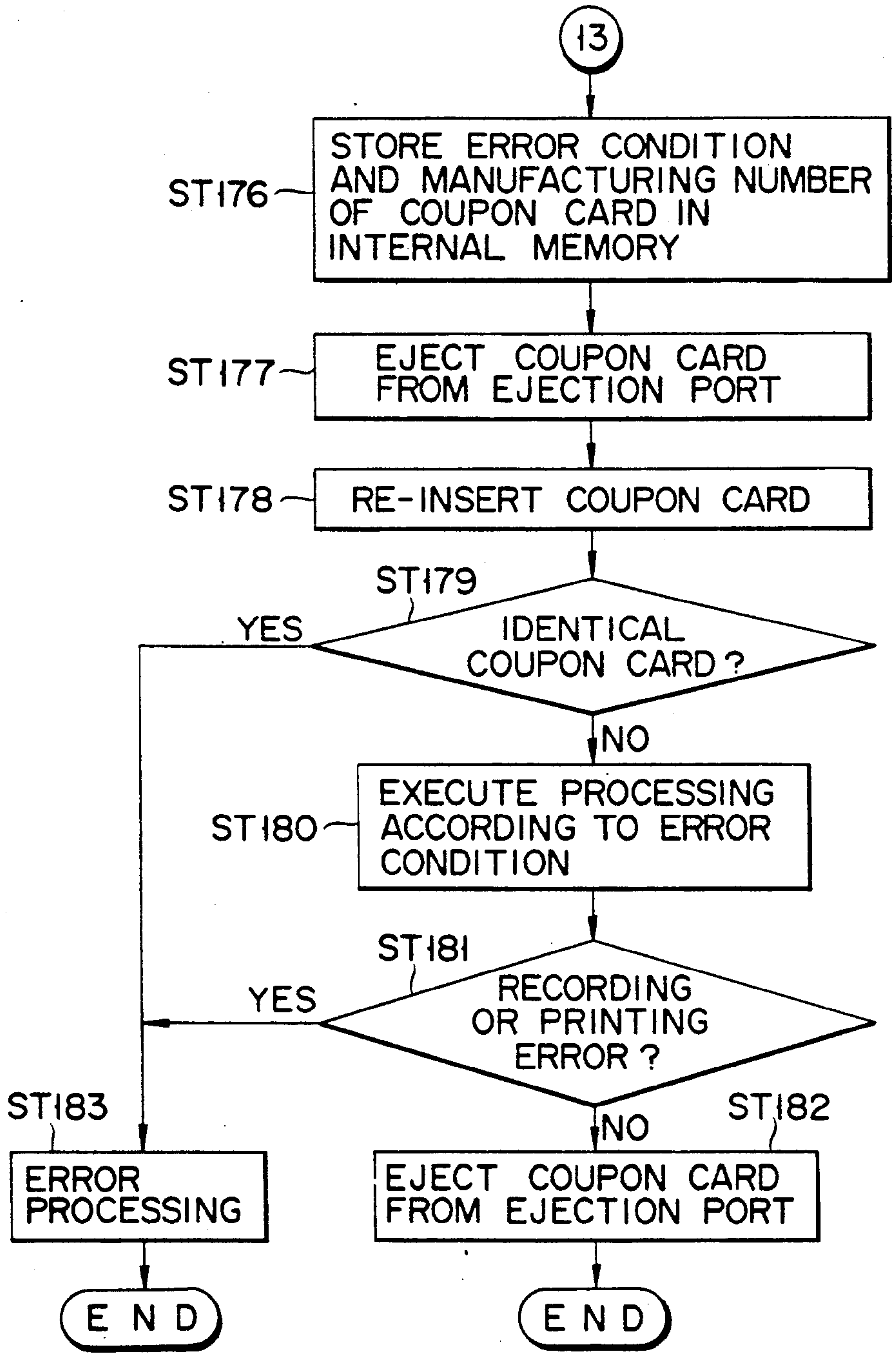

If it is determined in step 172 that the data are not normally magnetically recorded or it is determined in step 174 that the data are not normally printed, the CPU 70 stores the error condition and the manufacturing number of the presently processed coupon card B in the internal memory 70*a* (ST176 in FIG. 9I).

As the error condition, when the data are not normally magnetically recorded data indicating retry from magnetic recording is stored. When the data are not normally printed although they are normally magnetically recorded, data indicating retry from printing is stored.

The CPU 70 closes the gate 4, and conveys and exhausts the coupon card B from the exhaust port 3 (ST177). In this case, the CPU 70 causes the display unit 5 to display a guide message "machine error, please insert the card from the insertion port again".

The passenger inserts again the coupon card B exhausted from the exhaust port 3 into the insertion port 2 in accordance with this guide message (ST178). Upon card insertion, insertion of the coupon card B and its insertion direction are determined in the same manner as described above. The CPU 70 compares the manufacturing number read from the presently inserted coupon card B and that of the coupon card B ejected due to the error to check if the identical card is inserted (ST179).

If it is determined that the identical coupon card B is inserted, the CPU 70 executes processing according to the error condition stored in the internal memory 70*a* (ST180).

For example, when the data are not normally magnetically recorded, the same magnetic recording operation as in step 171 is performed and then the same printing operation as in step 173 is performed. When the data are not normally printed although they are normally magnetically recorded, only the printing operation as in step 173 is performed.

When the magnetic recording and/or printing are/is performed in accordance with the error condition, the CPU 70 opens the gate 4, i.e., allows passage of the passenger, and ejects the coupon card B from the ejection port 3 (ST182). As a result, the passenger passes the path 11, and receives the coupon card B.

When the identical coupon card B is not inserted (ST179) or when an error for magnetic recording or printing is detected again (ST181), error processing, e.g., clerk calling, is executed (ST183).

If it is determined that there are no remaining "coupons", the CPU 70 causes the display unit 5 to flicker a remaining count "0".

If illegal boarding is determined in step 170 in FIG. 9H, the CPU 70 ejects the coupon card B from the ejection port 3, and closes the gate 4, thus blocking passage of the passenger (ST184). The CPU 70 causes the monitoring apparatus 100 to generate an alarm (ST185).

As a result, a clerk confirms whether or not starting station data as entrance data is printed on the entrance information printing area 60*b* of the returned coupon card B. If the data is normally printed, the clerk inserts the coupon card B in the card processor 101.

The card processor 101 prints the destination station, machine number, and new remaining "coupon" count on the exit information printing area 60*c* of the coupon card B and updates and records the remaining "coupon" count data and the like on the magnetic recording portion. The coupon card B is returned to the passenger, and the passenger is permitted to pass the path 11.

When the starting station data as the entrance data is not recorded on the entrance information printing area 60*b*, the clerk performs processing for illegal boarding. In this case, both the clerk and the passenger can visually confirm whether or not the date and starting station data as the entrance data are recorded on the entrance information printing area 60*b*. Therefore, since illegal boarding can be confirmed not only mechanically but also visually, no quarrel occurs.

At the beginning or end of use of the money card A or coupon card B, holes are formed in the money card A or coupon card B by the punching unit 33. The CPU 70 checks based on the detection result of these holes by the punch hole detectors 31 and 32 whether or not the holes are precisely punched. According to this checking result, the above-mentioned error processing may be performed.

As described above, when the balance of the money card A is smaller than the fare of the boarding section and is short, insertion of another money card A is instructed, and the shortage can be paid by the other money card A. Even when the balance of the first inserted money card A is smaller than the fare of the boarding section, the shortage can be paid using the second inserted money card A.

When an error occurs during processing of magnetic recording, printing, or punching for the money card A or coupon card B, data indicating processing which caused the error is stored in the internal memory. When the identical card is inserted from the insertion port again, the processing is restarted from a point before the stored error point. Thus, processing can be restarted from one which caused the error.

When fare adjustment processing is performed for the ticket C, pass D, coupon ticket E, coupon card B, or the like, insertion of the money card A is instructed, and an amount to be adjusted is subtracted from the balance of the money card which is inserted according to this instruction. Thus, the fare adjustment processing can be performed within a short period of time in place of insertion of small change by the passenger, resulting in efficient examination processing.

A fare is discounted depending on a boarding time zone, and is subtracted from the money card A, thus improving popularity of the money card A. Passengers who can shift their boarding time from rush hour can be shifted in a time-of-day other than the rush hour, thus reducing rush hour congestion.

Note that the automatic examination apparatus of the present invention can be applied not only to a traffic organization such as a railway but also to an entrance/exit system of a recreation park, museum, or the like.

What is claimed is:

1. An automatic examination apparatus for permitting exit from a gate, comprising:

a convey path for conveying a first recording medium which is inserted from an insertion port and on which first information is recorded, reading means for reading the first information on said first recording medium during conveyance along said convey path, and judging means for judging in accordance with the read result of said reading means whether or not said first recording medium is correct, and for judging whether or not fare adjustment processing is necessary;

instruction means for, when said judging means determines that the fare adjustment processing is necessary, instructing insertion of a second recording medium which is different from said first recording medium and on which second information is recorded; and processing means for causing said reading means to read the second information on said second recording medium inserted from said insertion port upon instruction of said instruction means and performing fare adjustment processing on the basis of the read second information.

2. An apparatus according to claim 1, further comprising passage-permitting means for permitting or inhibiting passage of a person who inserted said first recording medium in accordance with the judging result of said judging means.

3. An apparatus according to claim 1, wherein the second information updated by the fare adjustment processing by said processing means is recorded on said second recording medium.

4. An apparatus according to claim 1, wherein said first recording medium is a boarding ticket, a pass, a coupon ticket, a money card, or a coupon card, and said second recording medium is a money card.

5. An automatic examination apparatus for permitting entrance into a gate or exit from a gate, comprising:

a convey path for conveying a recording medium which is inserted from an insertion port and on which magnetic information is recorded, reading means for reading the magnetic information on said recording medium during conveyance along said convey path, first judging means for judging in accordance with the read result of said reading means whether or not said recording medium is correct, recording means for recording magnetic information on said recording medium conveyed on said convey path, printing means for printing visual information on said recording medium after the magnetic information is recorded by said recording means, and ejecting means for ejecting said recording medium on said convey path from an ejection port after the magnetic information are recorded and the visual information are printed on said recording medium;

detection means for detecting an error of the magnetic information recorded on said recording medium or an error of the visual information printed on said recording medium;

storage means for, when said detection means detects the error, storing an error condition;

first processing means for, when said detection means detects the error, causing said ejection means to eject said recording medium on said convey path from said ejection port;

second judging means for, when said recording medium is ejected by said first processing means, judging whether or not a recording medium inserted from said insertion port is the same as the recording medium ejected by said ejection means; and second processing means for, when said second judging means determines that the identical recording medium is inserted, causing said recording means to record magnetic information again or causing said printing means to print visual information again in accordance with the error condition stored in said storage means.

6. An apparatus according to claim 5, wherein passage of a person who inserted said recording medium is permitted or inhibited in accordance with the judging result of said first judging means.

7. An apparatus according to claim 5, wherein said recording medium is a money card or a coupon card.

8. An apparatus according to claim 5, wherein when the error of the magnetic information recorded on said recording medium is detected, said storage means stores data indicating that neither recording of the magnetic information nor printing of the visual information are performed, and when only the error of the visual information printed on said recording medium is detected, stores data indicating that only printing of the visual information is not performed.

9. An apparatus according to claim 5, wherein when the error of the magnetic information recorded on said recording medium is detected, said second processing means records the magnetic information on said recording medium and prints the visual information on said recording medium, and when only the error of the visual information printed on said recording medium is detected, prints the visual information on said recording medium.

* * * * *